US009232141B2

(12) United States Patent
Nishihara et al.

(10) Patent No.: US 9,232,141 B2
(45) Date of Patent: Jan. 5, 2016

(54) MOVING MEMBER CONTROL APPARATUS AND IMAGING APPARATUS INCORPORATING THE SAME

(71) Applicant: OLYMPUS CORPORATION, Tokyo (JP)

(72) Inventors: Rintaro Nishihara, Tokyo (JP); Takashi Ishikawa, Tokyo (JP); Masanori Shimoyama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/480,755

(22) Filed: Sep. 9, 2014

(65) Prior Publication Data

US 2014/0375829 A1 Dec. 25, 2014

Related U.S. Application Data

(63) Continuation of application No. PCT/JP2013/050186, filed on Jan. 9, 2013.

(30) Foreign Application Priority Data

Mar. 28, 2012 (JP) .................................. 2012-072762

(51) Int. Cl.
| | |
|---|---|
| H04N 5/228 | (2006.01) |
| H04N 5/232 | (2006.01) |
| G03B 5/00 | (2006.01) |
| H04N 5/225 | (2006.01) |
| G05B 15/02 | (2006.01) |

(Continued)

(52) U.S. Cl.
CPC ................ *H04N 5/2328* (2013.01); *G03B 5/00* (2013.01); *G05B 15/02* (2013.01); *H02P 25/027* (2013.01);

(Continued)

(58) Field of Classification Search
USPC ................... 348/208.99, 208.2, 208.4, 208.7, 348/208.11
See application file for complete search history.

(56) References Cited

U.S. PATENT DOCUMENTS 8,279,293 B2 * 10/2012 Noto ......................... G03B 5/00
348/208.7
8,334,909 B2 * 12/2012 Shirono ............. H04N 5/23248
348/208.2

(Continued)

FOREIGN PATENT DOCUMENTS

JP 10-254019 A 9/1998
JP 2005-184122 A 7/2005

(Continued)

OTHER PUBLICATIONS

International Search Report dated Feb. 12, 2013 issued in PCT/JP2013/050186.

*Primary Examiner* — Ngoc-Yen Vu
(74) *Attorney, Agent, or Firm* — Scully, Scott, Murphy & Presser, P.C.

(57) ABSTRACT

The invention disclosed herein provides a small-format image-shake correction apparatus and an imaging apparatus incorporating the same. The moving member control apparatus is comprising a base part 10, a moving part 30 that is movable relatively to the base part 10, a first driving part 71 that applies an driving force to the moving part 30, a second driving part 72 that applies an driving force to the moving part 30, a third driving part 73 that applies an driving force to the moving part 30 from a position different from the first 71 and the second driving part 72, a control part 2 that gains control of the driving forces of the first 71, the second 72 and the third driving part 73, and a correction part 3 that makes correction of a first output value $I_{x1}$ produced from the control part 2 to the first driving part 71 and a second output value $I_{x2}$ produced from the control part 2 to the second driving part 72, depending on a third output value $I_y$ produced from the control part 2 to the third driving part 73, as shown in FIG. 12.

11 Claims, 21 Drawing Sheets

(51) Int. Cl.
    *H02P 25/02*       (2006.01)
    *H02P 25/06*       (2006.01)
    *G03B 13/00*       (2006.01)
    *H02P 7/00*        (2006.01)
    *H02P 31/00*       (2006.01)

(52) U.S. Cl.
    CPC .............. *H02P 25/028* (2013.01); *H02P 25/06* (2013.01); *H04N 5/2253* (2013.01); *G03B 2205/0038* (2013.01); *G03B 2205/0053* (2013.01); *H02P 31/00* (2013.01); *H02P 2007/0083* (2013.01)

(56) References Cited

U.S. PATENT DOCUMENTS

| | | | |
|---|---|---|---|
| 8,355,052 B2* | 1/2013 | Uenaka | H04N 5/23248 348/208.2 |
| 8,412,033 B2* | 4/2013 | Watanabe | G03B 5/00 396/55 |
| 8,643,732 B2* | 2/2014 | Miyoshi | H04N 5/2328 348/208.7 |
| 2006/0284495 A1 | 12/2006 | Seo et al. | |
| 2007/0127907 A1 | 6/2007 | Iwasaki et al. | |
| 2010/0101480 A1* | 4/2010 | Sugahara | B41J 3/36 116/205 |
| 2010/0135648 A1 | 6/2010 | Enomoto | |

FOREIGN PATENT DOCUMENTS

| | | |
|---|---|---|
| JP | 2007-156063 A | 6/2007 |
| JP | 2008-191282 A | 8/2008 |
| JP | 4564930 B2 | 10/2010 |
| JP | 2011-081417 A | 4/2011 |
| JP | 2012-037865 A | 2/2012 |

\* cited by examiner

MOVING MEMBER CONTROL APPARATUS AND IMAGING APPARATUS INCORPORATING THE SAME

INCORPORATING THE SAME

The present application claims priority under 35 USC section 119 from Japanese patent application serial No. 2012-072762 filed in Japan on Mar. 28, 2012, the entire contents of which are hereby expressly incorporated by reference into the present application.

BACKGROUND OF THE INVENTION

Art Field

One embodiment of the present invention relates to a moving member control apparatus capable of unerringly displacing or relocating a moving member having an imbalanced structure, and an imaging apparatus incorporating the same.

One example of controlling a moving member is a camera-shake corrector, and a conventional camera-shake corrector is disclosed in Patent Publication 1 as an example. This camera-shake corrector is designed to correct camera-shake by providing a pair of voice coil motors in each of the X and Y directions of a moving part having an imaging device mounted on it. The camera-shake corrector disclosed in Patent Publication 1 that prevents the imaging device from rotation upon its translational movements in the X and Y directions, because the voice coil motors are positioned such that forces are applied to the position of center of gravity of the moving portion.

Another conventional camera-shake corrector is disclosed in Patent Publication 2. The camera-shake corrector disclosed in Patent Publication 2 makes use of springs adapted to keep a moving part against rotation upon application of forces to it.

PRIOR ART

Patent Publications

Patent Publication 1: Japan Patent No. 4564930
Patent Publication 2: Japan Patent Publication No. JP(A) H10-254019

SUMMARY OF THE INVENTION

According to one embodiment of the invention, there is a moving member control apparatus provided that is characterized by comprising a foundation part, a moving part movable relative to the foundation part, at least three driving parts that applies driving forces to the moving part from different positions, a control part that controls the driving forces of the driving part, and a correction part operable depending on at least one output value produced from the control part to the driving parts to correct other output value produced from the controlling part to the driving parts.

According to another embodiment of the invention, there is a moving member control apparatus provided that is comprising a foundation part, a moving part movable relative to the foundation part, a first driving part that applies a driving force to the moving part, a second driving part that applies an driving force to the moving part, a third driving portion that applies an driving force to the moving part in a direction different from directions in which the first and second driving parts apply driving forces, a control part that controls the driving forces of the first, second and third driving parts, respectively, and a correcting part operable to make correction of a first output value produced from the control part to the first driving part and a second output value produced from the control part to the second driving portion, respectively, depending on a third output value produced from the control part to the third driving part.

One embodiment of the invention will now be explained.

The fact that the voice coil motors must be located such that forces are applied to the position of center of gravity as in Patent Publication 1 means that there is neither a degree of freedom in arrangement nor a contribution to size reductions. It is not easy to locate the voice coil motors such that forces are applied to the position of center of gravity, because high precision is in need.

With the arrangement of Patent Publication 2, it is somehow possible to prevent rotation of the moving part because of the use of springs, but it is impossible to gain proper control of the position of the moving part. In addition, the use of springs gives rise to shape deterioration and, hence, deterioration of the driving forces.

According to one embodiment of the invention, it is possible to provide a moving member control apparatus that is of small sizes and has high degrees of freedom in design and enables the moving part to be so controlled that it is quickly and unerringly displaced or relocated, and an imaging apparatus including the same as well.

Figure 1:
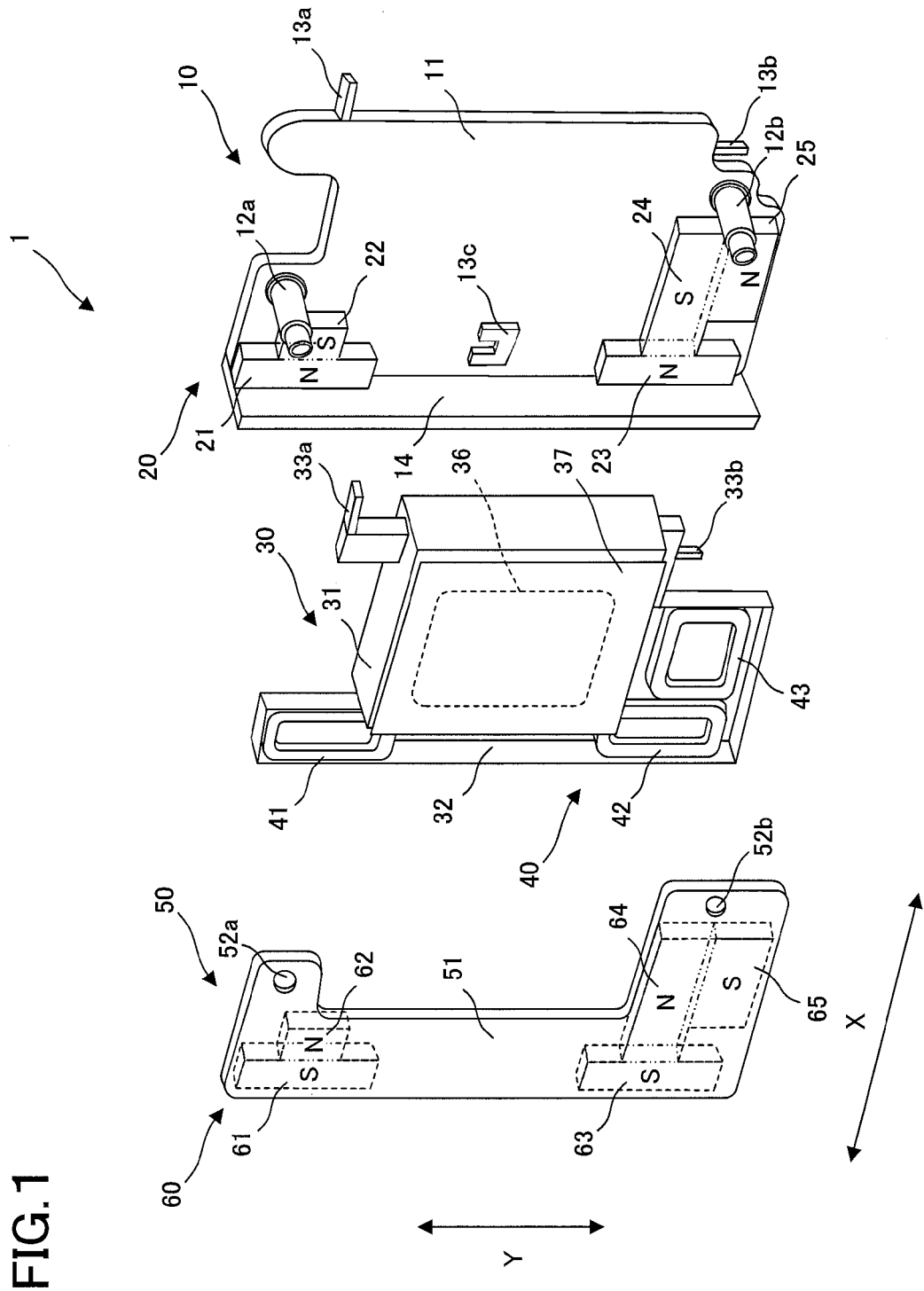
FIG. 1 is illustrative of the image-shake correction apparatus before assembled according to the first embodiment of the invention.

FIG. 1 is illustrative of the before-assembly image-shake correction apparatus 1 according to the first embodiment of the invention.

The image-shake correction apparatus 1 according to the first embodiment of the invention comprises a foundation or base part 10, a moving part 30 movably supported on the base part 10, and a magnet support part 50 that is opposed to the base part 10 with the moving part 30 between them and fixed to the base part 10.

The base part 10 is fixedly provided with a first permanent magnet group 20, and the magnet support part 50 is fixedly provided with a second permanent magnet group 60. The moving part 30 is fixedly provided with a coil group 40. The first and second permanent magnet groups 20 and 60 include oppositely magnetized and located portions in such a way as to generate a magnetic field in an opposite space. The coil group 40 is located in a space where the first permanent magnet group 20 is opposite to the second permanent magnet group 60. In FIG. 1 and the following figures, it is noted that the magnetic poles of the first and second permanent magnet groups 20 and 60 face on the side of the coil group 40.

Figure 2:
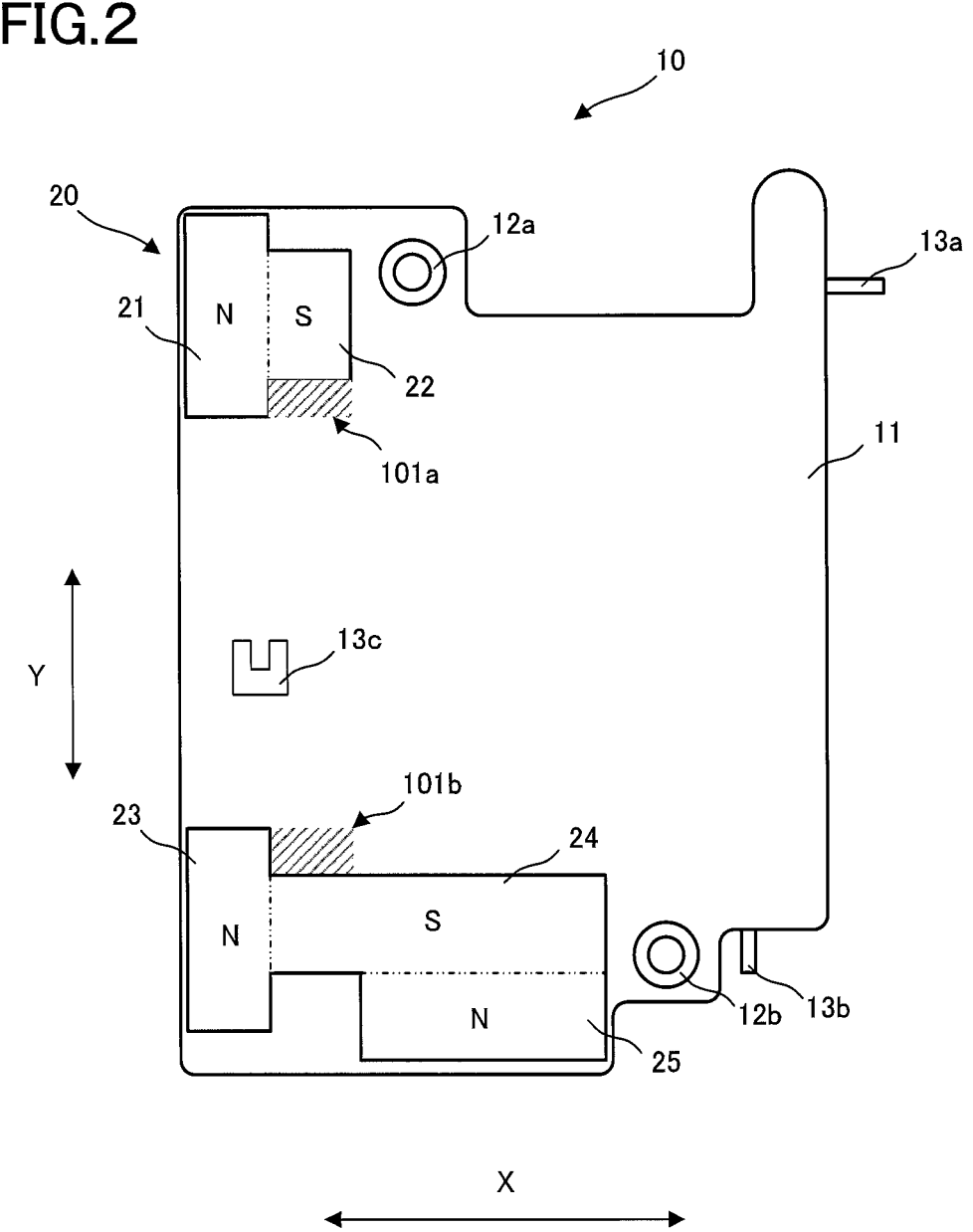
FIG. 2 is illustrative of the base part.

FIG. 2 is illustrative of the base part 10.

The base part 10 comprises a flat plate base body 11 formed of a magnetic material such as iron or an iron compound, supporting through-holes 12a and 12b that are provided through the base body 11 for inserting screws (not shown) through them to support the magnet support part 50 on the base part 10, and a first set of spring supports 13a, 13b and 13c for supporting springs (not shown) to support the moving part 30 on the base part 10 in a movable manner.

Here the X direction is defined as a first direction to the base part 10, and the Y direction is defined as a second direction orthogonal to the X direction, as depicted in FIG. 2.

The first permanent magnet group 20 on the base part 10 comprises a first magnet part 21 that is N pole-magnetized on the coil group 40 side, a second magnet part 22 that opposes to the first magnet part 21 in the X direction and is S pole-magnetized on the coil group 40 side, a third magnet part 23 that is located away from the first magnet part 21 in the Y direction and N pole-magnetized on the coil group 40 side, a fourth magnet part 24 that opposes to the third magnet part 23 in the X direction and is S pole-magnetized on the coil group 40 side, and a fifth magnet part 25 that opposes to the fourth magnet part 24 in the Y direction and N pole-magnetized on the coil group 40 side. Note here that the faces of the first 21 to the fifth magnet part 25 on the coil group 40 sides and the opposite sides are oppositely magnetized.

The side of the second magnet part 22 in the Y direction of the fourth magnet part 24 is shorter than the first magnet part 21 with a first space 101a leaving as a cutout that is not opposite to the first magnet part 21, and the side of the fourth magnet part 24 in the Y direction of the second magnet part 22 is shorter than the third magnet part 23 with a second space 101b leaving as a cutout that is not opposite to the third magnet part 23.

Figure 3:
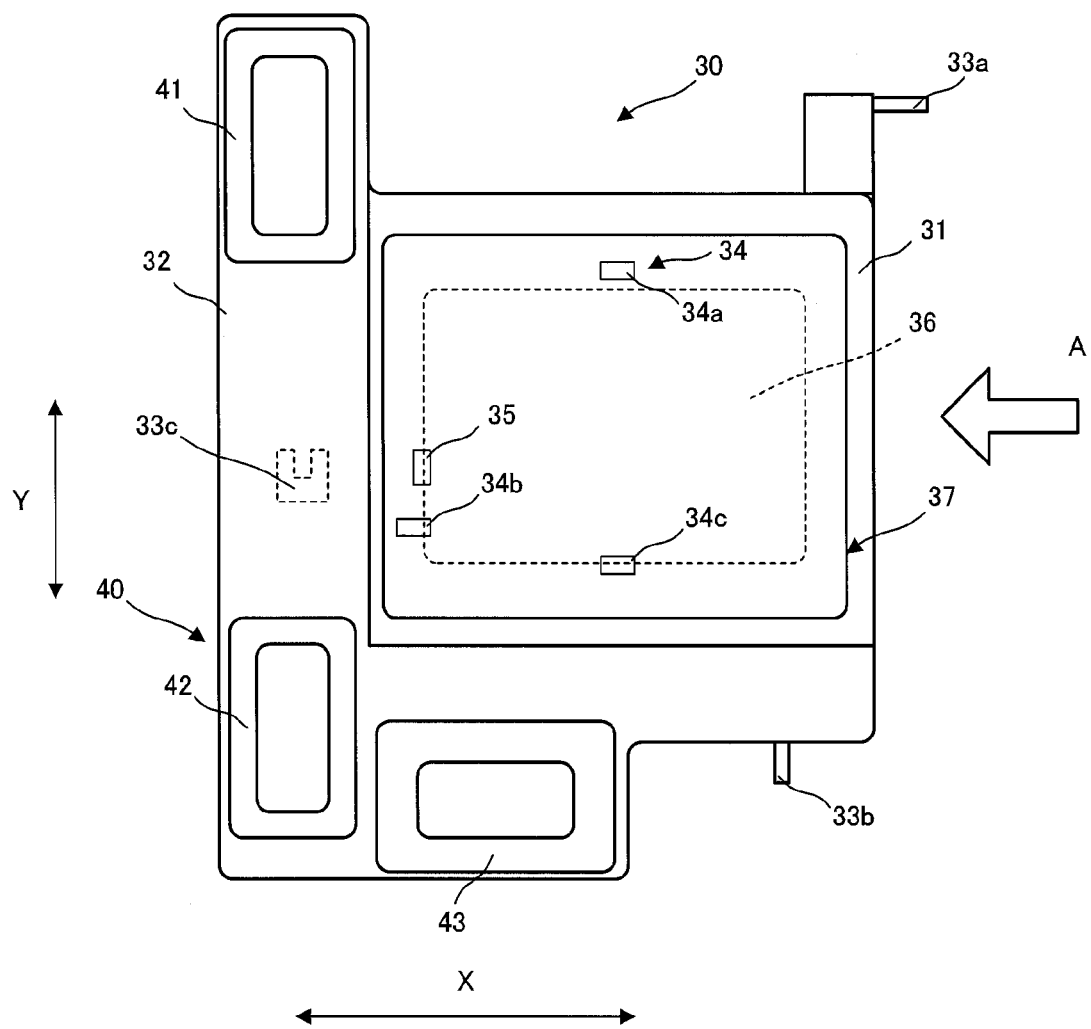
FIG. 3 is illustrative of the moving part.
Figure 4:
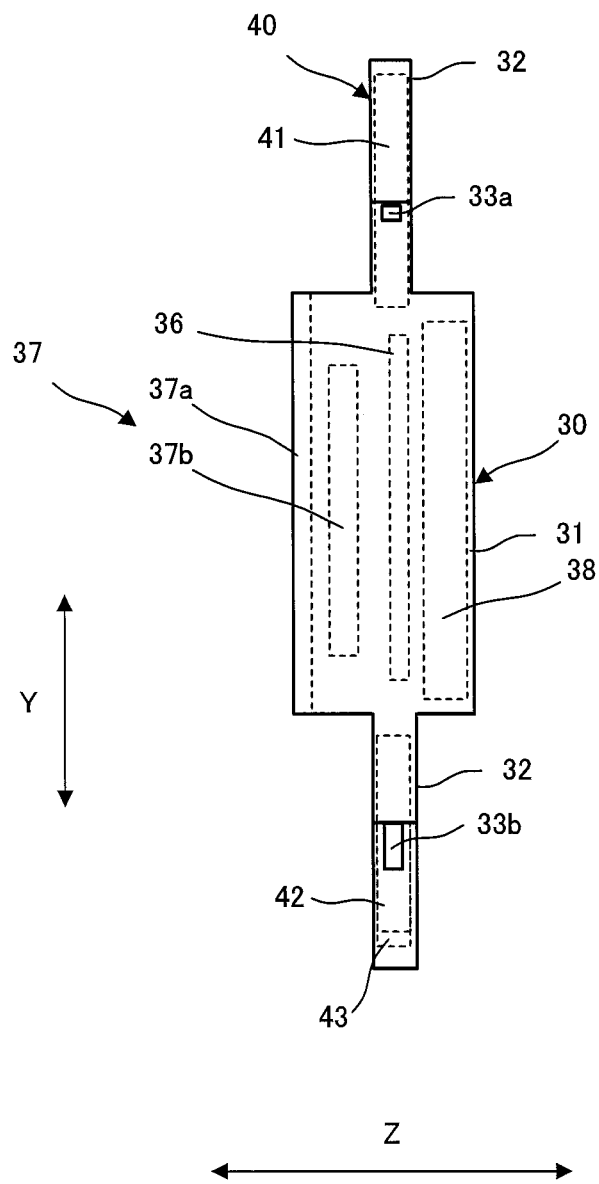
FIG. 4 is illustrative of FIG. 3 as viewed from an arrow A.

FIG. 3 is illustrative of the moving part 30, and FIG. 4 is an illustration of FIG. 3 as viewed from Arrow A.

The moving part 30 comprises a moving body 31 formed of a nonmagnetic material such as an aluminum alloy or synthetic resin, a coil housing 32 provided on a portion of the circumference of the moving body 31, and a second set of spring supports 33a, 33b and 33c for supporting springs (not shown) to support the moving part 30 on the base part 10 in a movable manner. The moving part 30 is further provided with a set of Hall elements 34 and sensors such as a temperature sensor 35. The Hall element set 34 includes a first 34a, a second 34b and a third Hall element 34c.

Here the X direction is defined as a first direction to the moving part 30, and the Y direction is defined as a second direction orthogonal to the X direction, as depicted in FIG. 3.

The moving body 31 includes an imaging device 36 for photoelectric conversion of light, a filter group 37 and an electric device 38 mounted on it. The filter group 37 comprises an ultrasonic filter 37a and an infrared cut filter 37b as viewed from its side away from the imaging device 36. On the side of the filter group 37 opposite to the imaging device 36 there is the electric device 38 mounted to detect the quantity of light received at the imaging device and process image signals or the like based on that quantity of light received.

The coil housing 32 is provided on a portion of the circumference of the moving body 31 and has a recess for stowing the coil group 40. The moving body 31 is longer than the coil housing 32 in the Z direction orthogonal to the X and Y directions.

The coil group 40 comprises a first coil 41, a second coil 42 and a third coil 43. The first coil 41 is located in opposition to the first 21 and the second magnet part 22 on the base part 10 shown in FIG. 2. The second coil 42 is located in such a way as to oppose to the third 23 and the fourth magnet part 24 on the base part 10 shown in FIG. 2, and the third coil 43 is located in such a way as to oppose to the fourth 24 and the fifth magnet part 25 on the base part 10 shown in FIG. 2. The aforesaid first, second and third Hall elements 34a, 34b and 34c are mounted in the vicinity of the first, second and third coils 41, 42 and 43, respectively.

Figure 5:
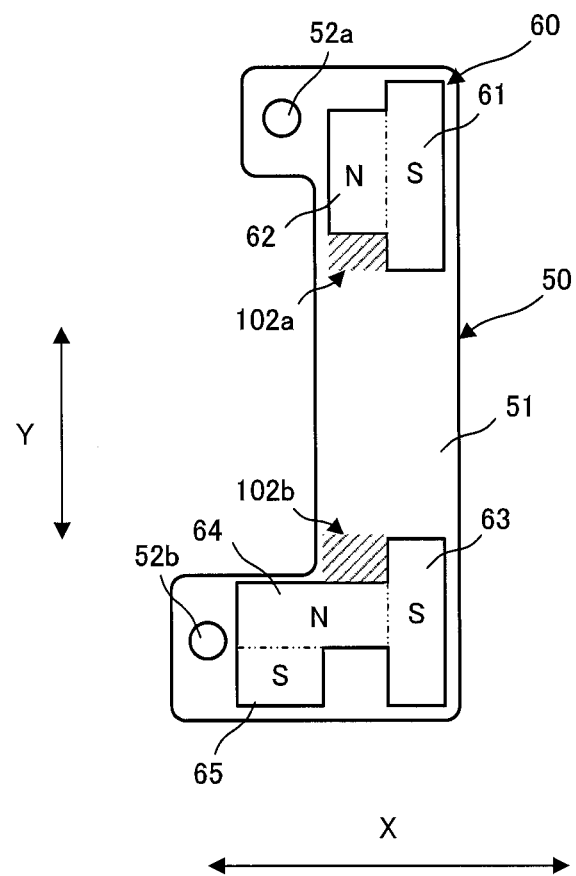
FIG. 5 is illustrative of the magnet support part.

FIG. 5 is illustrative of the magnet support part 50 of FIG. 1, as viewed from the moving part 30 side.

The magnet support part 50 comprises a flat plate support body 51 formed of a magnetic material such as iron or an iron compound, and supporting through-holes 52a and 52b that are provided through the support body 51 for inserting screws (not shown) through it to support the magnet support part 50 relative to the base body 10.

Here the X direction is defined as a first direction to the magnet support part 50, and the Y direction is defined as a second direction orthogonal to the X direction, as shown in FIG. 4.

The second permanent magnet group 60 on the magnet support part 50 comprises a first opposite magnet part 61 that is S pole-magnetized on the coil group 40 side, a second opposite magnet part 62 that is opposite to the first opposite magnet part 61 and N pole-magnetized on the coil group 40 side, a third opposite magnet part 63 that is located away from the first opposite magnet part 61 in the Y direction and S pole-magnetized on the coil group 40 side, a fourth opposite magnet part 64 that is opposite to the third opposite magnet part 63 in the X direction and N pole-magnetized on the coil group 40 side, and a fifth opposite magnet part 65 that is in opposition to the fourth magnet part 64 in the Y direction and S-magnetized on the coil group 40 side. Note here that the first 61 to the fifth opposite magnet part 65 are oppositely magnetized on the coil group 40 side and the opposite side.

The side of the fourth opposite magnet part 64 in the Y direction of the second opposite magnet part 62 has a cutout and is shorter than the first opposite magnet part 61, with a third space 102a serving as a cutout that is not in opposition to the first opposite magnet part 61, and the side of the second opposite magnet part 62 in the Y direction of the fourth opposite magnet part 64 has a cutout and is shorter than the third opposite magnet part 63, with a fourth space 102b serving as a cutout that is not in opposition to the third opposite magnet part 63.

Figure 6:
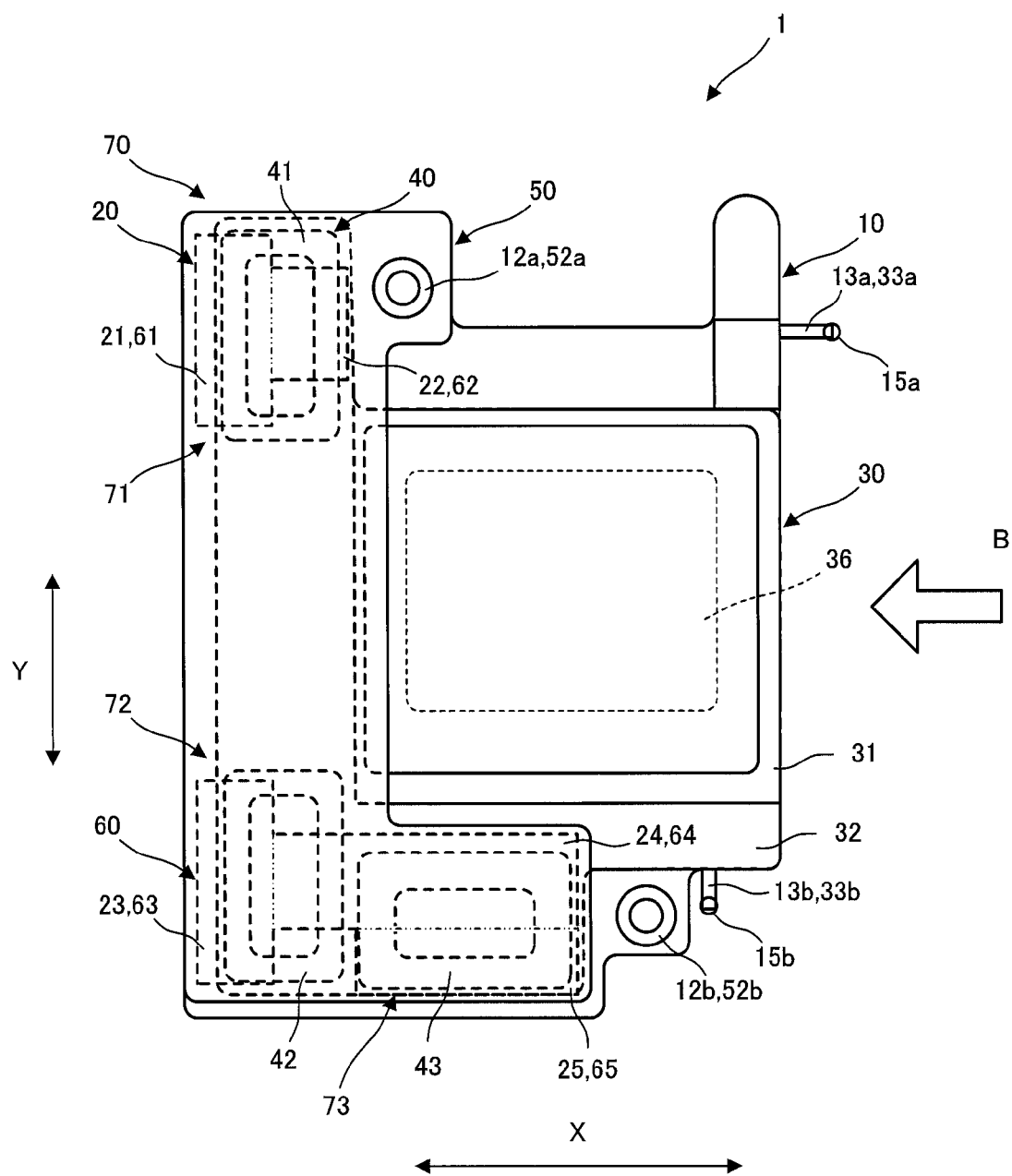
FIG. 6 is illustrative of the image-shake corrector assembly after assembled according to the first embodiment of the invention.
Figure 7:
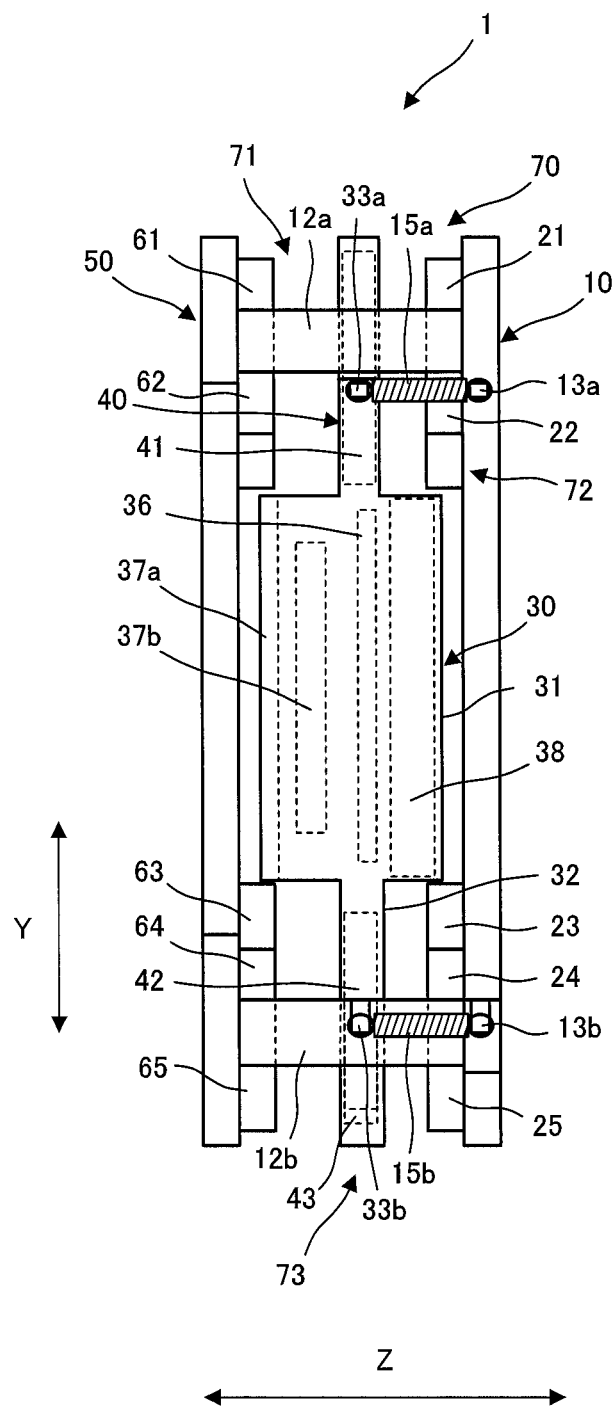
FIG. 7 is illustrative of FIG. 6 as viewed from an arrow B.

FIG. 6 is illustrative of the image-shake correction apparatus 1 assembled according to the first embodiment of the invention, and FIG. 7 is an illustration of FIG. 6 as viewed from Arrow B.

To assemble the image-shake correction apparatus 1 according to the first embodiment of the invention, screws (not shown) are inserted through the supporting through-holes 12a and 12b in the base part 10 shown in FIG. 1 and the threaded through-holes 52a and 52b in the magnet support part 50, and the support body 51 of the magnet support part 50 is supported by a plate 14 attached to the base body 11 of the base part 10. Consequently, the support body 51 will be firmly supported on the base body 11 at three sites: supporting through-holes 12a and 12b and plate 14. In addition, coil springs 15a, 15b and 15c are mounted on the first spring supports 13a, 13b and 13c of the base part 10, and on the second spring supports 33a, 33b and 33c of the moving part 30, respectively.

Preferably, the base part 10 and moving part 30 are supported in a fashion generally called the ball support wherein they are supported by a plurality of spherical balls (not shown) held between them. As the spherical balls roll, it enables the moving part 30 to move relative to the base part 10.

With the image-shake correction apparatus 1 assembled in place, the first permanent magnet group 20 of the base part 10 is opposite to, and away from, the second permanent magnet group 60 of the magnet support portion 50. In a space between the first permanent magnet group 20 and second permanent magnet group 60, there is a magnetic field generated in a space between the magnets because the they are oppositely magnetized. Then, the coil group 40 of the moving part 30 is located in a discrete space having the magnetic field generated in it. Such arrangement of the first permanent magnet group 20, second permanent magnet group 60 and coil group 40 allows for formation of a voice coil motor 70.

In the first embodiment of the invention, the first and second magnet parts 21 and 22, first coil 41 and first and second opposite magnet parts 61 and 62 are combined together into a first X-direction voice coil motor 71 operating as a first voice coil motor for moving the moving part 30 in the X direction defined as the first direction, and the third and fourth magnet parts 23 and 24, second coil 42 and third and fourth opposite magnet portions 63 and 64 are combined together into a second X-direction voice coil motor 72 operating as a first voice coil motor for moving the moving part 30 in the X direction defined as the first direction. Further, the fourth and fifth magnet parts 24 and 25, third coil 43 and fourth and fifth opposite magnet parts 64 and 65 are combined together into a Y-direction voice coil motor 73 operating as a second voice coil motor for moving the moving part 30 in the Y direction defined as the second direction.

Consequently, the fourth magnet part 24 and the fourth opposite magnet part 64 will be included in both the second X-direction voice coil motor 72 and Y-direction voice coil motor 73. Thus, at least one magnet part in the first and second magnet groups 20 and 21 is set up in such a way as to be included in both the X- and Y-direction voice coil motors 72 and 73 to have a dual function of moving the moving part 30 in the X and Y directions. This will contribute to a parts count reduction, and make it possible to reduce the size and cost of the apparatus.

In the first embodiment of the invention, as electric currents flow through the first and second coils 41 and 42, it causes the moving part 30 to move in the X direction, and as an electric current flows through the third coil 43, it causes movement of the moving part 30 in the Y direction.

In the embodiment of the invention here, the first and second magnet parts 21 and 22 in the first permanent magnet group 20 are magnetized as a single magnet; the third, fourth and fifth magnet parts 23, 24 and 25 in the first permanent magnet group 20 are magnetized as a single magnet; the first and second opposite magnet parts 61 and 62 in the second permanent magnet group 60 are magnetized as a single magnet; and the third, fourth and fifth opposite magnet parts 63, 64 and 65 in the second permanent magnet group 60 are magnetized as a single magnet. However, they may be magnetized as separate magnets or, alternatively, some of them may be magnetized as a separate magnet. Such separate magnetization could facilitate processing, and allow for simple low-cost production. The numbers of turns of the first 41, the second 42, and the third coil 43 may be varied depending on the volume of the associated cutout.

It is here to be noted that how to fix each permanent magnet to the base part 10 and magnet support part 50 is not specifically limited: it may be fixed using adhesives, screwing, caulking or the like. In the first embodiment of the invention, an adhesive is typically used to fix the magnets to the base part 10 and magnet support part 50.

Figure 8:
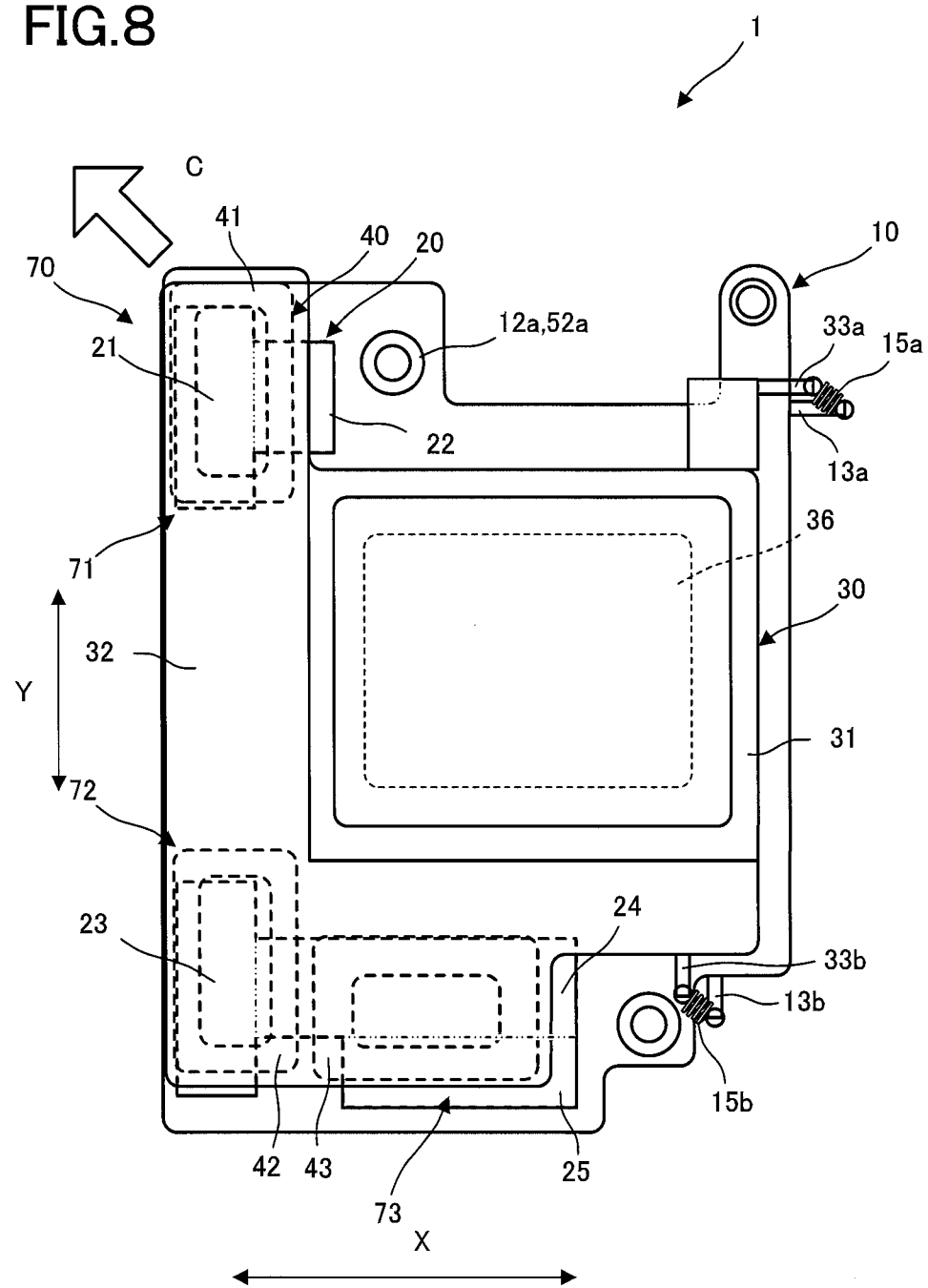
FIG. 8 is illustrative of the operation of the image-shake correction apparatus after assembled according to the first embodiment of the invention.
Figure 9:
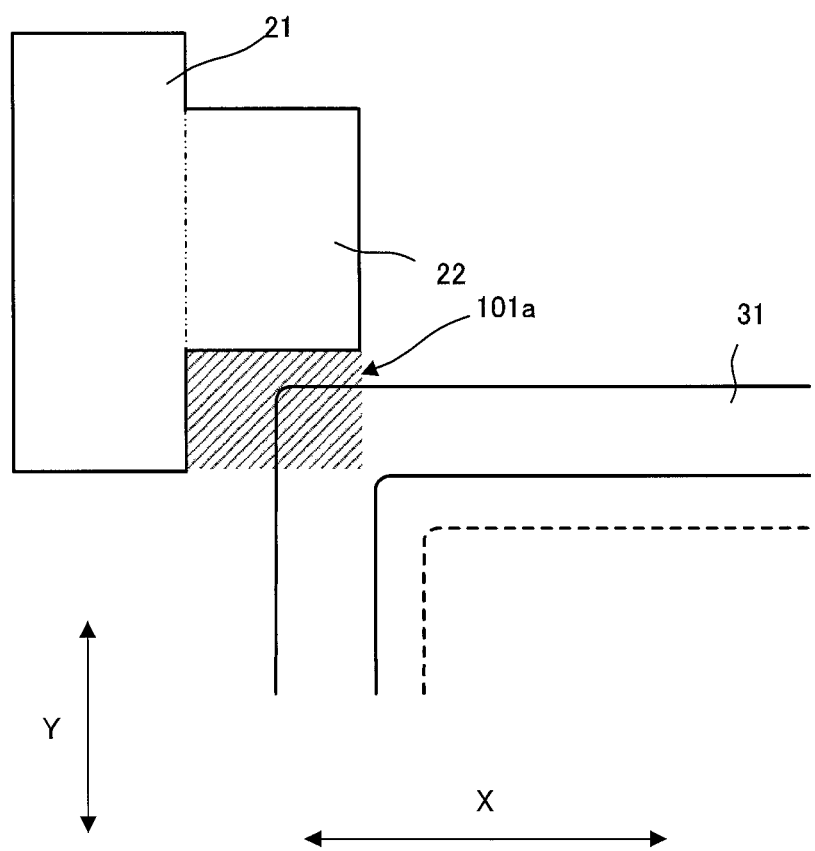
FIG. 9 is an enlarged view of a part of FIG. 8.

FIG. 8 is illustrative of the operation of the image-shake correction apparatus 1 assembled according to the first embodiment of the invention, and FIG. 9 is an enlarged view of a portion of FIG. 8. It is here to be noted that the magnet support part 50 is left out of FIG. 8 for the purpose of making movement of the moving part 30 more legible, and only the first and second magnet parts 21 and 22 are shown together with the moving body 31 in FIG. 9.

As shown typically in FIG. 8, suppose now that the moving part 30 moves relative to the base part 10 in a direction indicated by Arrow C. Thereupon, the moving body 31 comes closer to the first and second magnet parts 21 and 22, as shown in FIG. 9. If the Y-direction length of the second magnet part 22 is the same as the Y-direction length of the first magnet part 21, then the moving body 31 will interfere with the second magnet part 22.

With the first space 101a defined by a cutout formed by making the Y-direction length of the second magnet part 22 shorter than the Y-direction length of the first magnet part 21, it is then possible to avoid interference of the moving body 31 with the second magnet part 22, thereby reducing the size of the apparatus. It is here to be noted that if the first and second spaces 101a and 101b serving as cutouts are positioned in the central direction side of the base part 10 or moving part 30, the apparatus could be further reduced in size, or if the cutouts are positioned in a position where they overlap at least a portion of the range wherein the moving part 30 is movable by the voice coil motor 70, the apparatus could be even further reduced in size.

It is here to be noted that if other magnet part is provided with a cutout too, it is then possible to avoid interference of the moving body 31 with that magnet part or interference of that magnet part with other member, thereby reducing the size of the apparatus without narrowing down the moving range of the moving part 30.

While the first embodiment of the invention is explained with reference to a specific arrangement having permanent magnet groups in both the base part 10 and the magnet support part 50, it is to be understood that only one of them may include permanent magnet groups provided that there is an output capable of moving the moving part 30.

Reference will now be made to how to control the moving part in the image-shake correction apparatus 1 according to the first embodiment of the invention.

Figure 10:
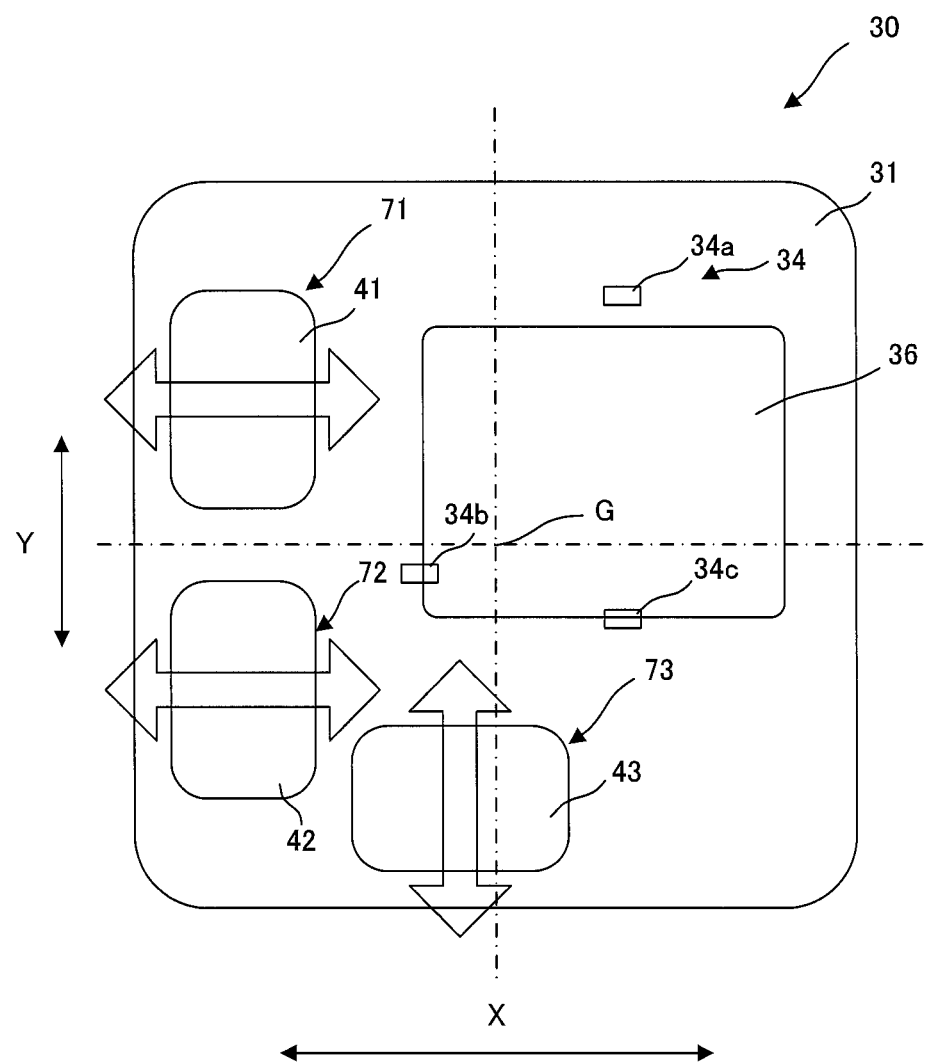
FIG. 10 is illustrative in schematic of the moving part in the image-shake correction apparatus according to the first embodiment of the invention.

FIG. 10 is illustrative in schematic of the moving part 30 in the image-shake correction apparatus 1 according to the first embodiment of the invention.

With the image-shake correction apparatus 1 of the first embodiment, a first X-direction voice coil motor 71 as the first driving part and a second X-direction voice coil motor 72 as the second driving part are actuated to apply forces to the moving part 30, as shown in FIG. 10, so that the moving part 30 can move in the X-direction, and a Y-direction voice coil motor 73 as the third driving part is actuated to apply force to the moving part 30 so that it can move in the Y-direction. Note here that for the first, second and third driving parts, not only may the voice coil motors be used, but other actuators capable of producing driving forces may be used as well.

For instance, while the first and second X-direction voice coil motors 71 and 72 are driven in a constant position, a driving quantity instruction is given to the Y-direction voice coil motor 73 for actuation thereby implementing Y-direction translational driving, and while the Y-direction voice coil motor 73 is driven in a constant position, the same driving quantity instruction is given to the first and second X-direction voice coil motors 71 and 72 for actuation thereby implementing X-direction translational motion. Further, while the Y-direction voice coil motor 73 is driven in a constant position, a different driving quantity instruction is given to the first and second X-direction voice coil motors 71 and 72 for actuation thereby implementing rotational motion depending on the quantity of difference between the different driving quantities.

It is here to be noted that each of the voice coil motors 71, 72 and 73 has in the vicinity of the moving part 30 the Hall element set 34 acting as the associated position acquisition part so as to detect the positions of the voice coil motors 71, 72 and 73, for instance, the positions of the first, second and third coils 41, 42 and 43 moving away from their normal states.

Figure 11:
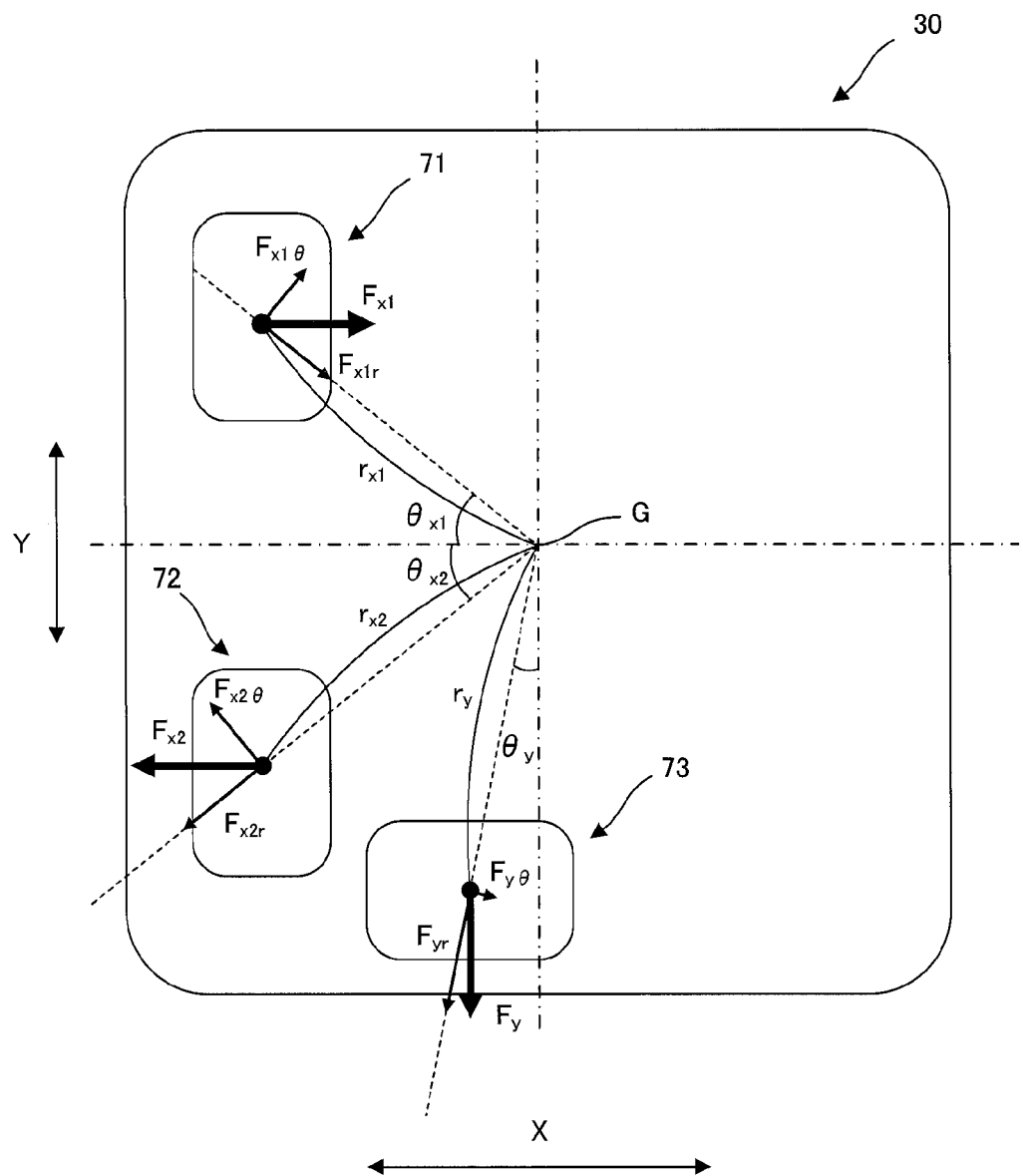
FIG. 11 is indicative of the directions of driving forces acting on the moving part in the image-shake correction apparatus according to the first embodiment of the invention.

FIG. 11 is indicative of the directions of driving forces acting on the moving part 30 in the first embodiment of the invention.

As shown in FIG. 11, the moving part 30 receives driving forces from the voice coil motors 71, 72 and 73. Referring to the first arrangement of the invention where the position of center of gravity G of the moving part 30 does not lie on the straight line of the vector of force given by the Y-direction voice coil motor 73 to the moving part 30 and the driving force acts in a direction diverting from the center of gravity, the application of force to the moving part 30 by the Y-direction voice coil motor 73 will give rise to not only translational force going toward the X-direction but also rotational force about the center of gravity and translational force going toward the X-direction. Although the rotational force and the translational force going toward the X-direction are unnecessary force components, it is possible to reduce them by simple feedback control of the first and second X-direction voice coil motors 71 and 72. However, the rotational force and the translational force going toward the X-direction constantly keep on disturbing the first and second X-direction voice coil motors 71 and 72, possibly resulting in a lowering of position control precision.

In the first embodiment of the invention, therefore, the voice coil motors 71, 72 and 73 are controlled such that there is a further lowering of the rotational force and the translational force going toward the X-direction produced upon the application of force to the moving part 30 by the Y-direction voice coil motor 73.

It is here to be understood that if voice coil motors 71, 72 and 73 are designed such that the driving forces are applied to the moving part 30 in a direction diverting from the position of center of gravity G, it is then possible to achieve size reductions and high degrees of freedom in design. Further, if at least two voice coil motors are designed in such a way as to apply parallel forces to the moving part 30, it is then possible to achieve a fast computation of the unerring position of the moving part 30 and reduce loads on the computation.

Figure 12:
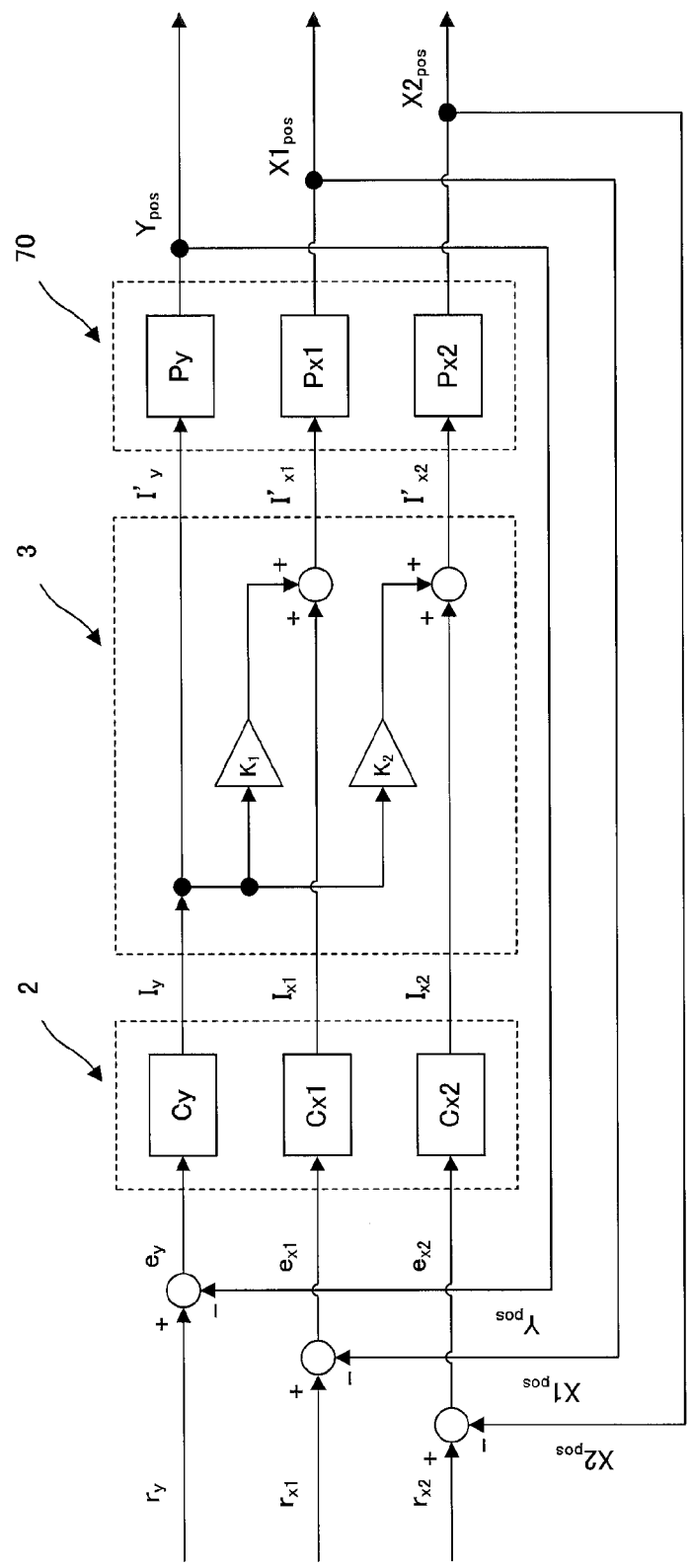
FIG. 12 is a control block diagram for the image-shake correction apparatus according to the first embodiment of the invention.

FIG. 12 is a control block diagram for the image-shake correction apparatus 1 according to the first embodiment of the invention.

The control block for the image-shake correction apparatus 1 includes a control part 2, a correction part 3 and a voice coil motor 70.

First, a first driving signal $r_{x1}$ indicative of a relocation position is entered from a first instruction part (not shown) into a first X-direction voice coil motor 71, whereupon there is a first deviation or first X-direction deviation $e_{x1}$ calculated in a first deviation calculation part, the first X-direction deviation $e_{x1}$ being a difference between the first driving signal $r_{x1}$ and the present position $X1_{pos}$ of the first X-direction voice coil motor 71: there is a feedback control achieved.

Likewise, a second driving signal $r_{x2}$ indicative of a relocation position is entered from a second instruction part (not shown) into a second X-direction voice coil motor 72, whereupon there is a second deviation or second X-direction deviation $e_{x2}$ calculated in a second deviation calculation part, the second X-direction deviation $e_{x2}$ being a difference between the second driving signal $r_{x2}$ and the present position $X2_{pos}$ of the second X-direction voice coil motor 72: there is a feedback control achieved.

Further, a third driving signal $r_y$ indicative of a relocation position is entered from a third instruction part (not shown) into a Y-direction voice coil motor 73, whereupon there is a third deviation or Y-direction deviation $e_{x1}$ calculated in a third deviation calculation part, the Y-direction deviation $e_{x1}$ being a difference between the third driving signal $r_y$ and the present position $Y_{pos}$ of the Y-direction voice coil motor 73: there is a feedback control achieved.

A control part 2 receives the first X-direction deviation $e_{x1}$, and implements phase compensation/gain multiplication processing via an IIR (Infinite Impulse Response) filter or the like inside it, producing a first X-direction filter output $I_{x1}$. The control part 2 also receives the second X-direction deviation $e_{x2}$, and implements phase compensation/gain multiplication processing via an IIR filter or the like inside it, producing a second filter output $I_{x2}$. Further, the control part 2 receives the Y-direction deviation $e_y$, and implements phase compensation/gain multiplication processing via an IIR filter or the like inside it, producing a Y-direction filter output $I_y$.

A correction part 3 receives the first X-direction filter output $I_{x1}$, which is in turn added to a first correction value $K_1 I_y$ obtained by multiplying the Y-direction filter output $I_y$ by a first correction coefficient $K_1$, producing a first X-direction output $I'_{x1}$. The correction part 3 also receives the second X-direction filter output $I_{x2}$, which is in turn added to a second correction value $K_2 I_y$ obtained by multiplying the Y-direction filter output $I_y$ by a second coefficient $K_2$, producing a second X-direction output $I'_{x2}$. Further, the correction part 3 receives the Y-direction filter output $I_y$, which is then produced directly as a Y-direction output $I'_y$.

The voice coil motor 70 applies a current in conformity with the first X-direction output I'$_{x1}$ from the correction part 3 to the first coil 41, driving the first X-direction voice coil motor 71. The voice coil motor 70 also applies a current in conformity with the second X-direction output I'$_{x2}$ from the correction part 3 to the second coil 42, driving the second X-direction voice coil motor 72. Further, the voice coil motor 70 applies a current in conformity with the Y-direction output I'$_y$ from the correction part 3 to the third coil 43, driving the Y-direction voice coil motor 73.

Reference is here made to how to calculate the first and second correction coefficients K$_1$ and K$_2$ used for multiplication in the correction part 3.

As shown in FIG. 11, the force needed for the Y-direction voice coil motor 73 is only the force for driving and translating the moving part 30 in the Y-direction. In other words, other unnecessary forces resulting from the driving force F$_y$ of the Y-direction voice coil motor 73 must be canceled out by the driving force F$_{x1}$ of the first X-direction voice coil motor 71 and the driving force F$_{x2}$ of the second X-direction voice coil motor 72.

For the purpose of canceling out other unnecessary forces resulting from the driving force F$_y$ of the Y-direction voice coil motor 73 by the driving force F$_{x1}$ of the first X-direction voice coil motor 71 and the driving force F$_{x2}$ of the second X-direction voice coil motor 72, it is required to satisfy the following condition (1) for canceling out rotational force and the following condition (2) for canceling out translational force.

$$F_{y\theta} \cdot r_y + F_{x1\theta} \cdot r_{x1} + F_{x2\theta} \cdot r_{x2} = 0 \quad (1)$$

$$F_{yr} \cdot \sin\theta_y + F_{x1r} \cdot \cos\theta_{x1} + F_{x2r} \cdot \cos\theta_{x2} = 0 \quad (2)$$

where
$|F_{y\theta}| = |F_y| \cdot \sin\theta_y$
$|F_{x1\theta}| = |F_{x1}| \cdot \sin\theta_{x1}$
$|F_{x2\theta}| = |F_{x2}| \cdot \sin\theta_{x2}$
$|F_{yr}| = |F_y| \cdot \cos\theta_y$
$|F_{x1r}| = |F_{x1}| \cdot \cos\theta_{x1}$
$|F_{x2r}| = |F_{x2}| \cdot \cos\theta_{x2}$ Note here that each variable contains a sign in conformity to the direction of a vector.

By solving the simultaneous equations: conditions (1) and (2), it is thus possible to find the driving force F$_{x1}$ of the first X-direction voice coil motor 71 and the driving force F$_{x2}$ of the second X-direction voice coil motor 72 that cancel out the driving force F$_y$: rotational force and X-translational force of the X-direction voice coil motor 73 in an arbitrary direction.

The driving force F$_y$ of the Y-direction voice coil motor 73 upon mounted on a controller may take on various values and, correspondingly, it is necessary to vary the driving force F$_{x1}$ of the first X-direction voice coil motor 71 and the driving force F$_{x2}$ of the second X-direction voice coil motor 72.

Here the driving force F$_{x1}$ of the first X-direction voice coil motor 71 and the driving force F$_{x2}$ of the second X-direction voice coil motor 72 are defined as the first correction coefficient K$_1$ and the second correction coefficient K$_2$, respectively, with the proviso that the driving force F$_y$ of the Y-direction voice coil motor 73 is defined as 1. If the values entered into the first and second X-direction voice coil motors 71 and 72 are corrected by the first and second correction coefficients K$_1$ and K$_2$, it is then possible to apply constantly proper processing to the varying F.

Figure 13:
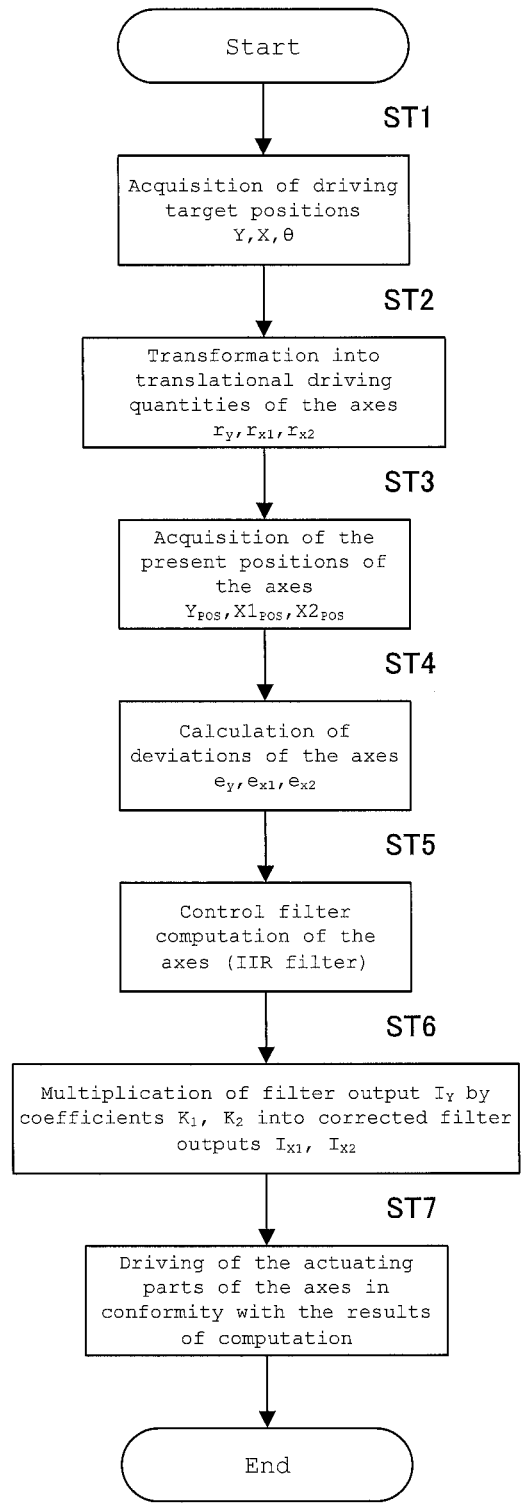
FIG. 13 is a flowchart for the image-shake correction apparatus according to the first embodiment of the invention.

FIG. 13 is a flowchart for the image-shake correction apparatus 1 according to the first embodiment of the invention.

In the control process of the moving member in the image-shake correction apparatus 1 according to the first embodiment of the invention, driving target positions X, Y and θ are first acquired in Step 1 (ST1).

Then, the process goes to Step 2 in which the driving target positions X, Y and θ are transformed into translational driving quantities r$_{x1}$, r$_{x2}$ and r$_y$ in the X1-, X2- and Y-direction axes (ST2).

Then, the process goes to Step 3 in which the present positions X1$_{pos}$, X2$_{pos}$ and Y$_{pos}$ of the axes are acquired via the first, second and third Hall elements 34a, 34b and 34c, respectively (ST3).

Then, the process goes to Step 4 in which the differences between the present positions X1$_{pos}$, X2$_{pos}$ and Y$_{pos}$ acquired in Step 3 are found from the translational driving quantities r$_{x1}$, r$_{x2}$ and r$_{x3}$ in the X1-, X2- and Y-direction axes to figure out the deviations e$_y$, e$_{x1}$ and e$_{x2}$ of the axes (ST4).

Then, the process goes to Step 5 in which the control filter outputs I$_{x1}$, I$_{x2}$ and I$_y$ of the axes are computed in the control part 2 (ST5).

Then, the process goes to Step 6 in which, in the correction part 3, the first correction value K$_1$I$_y$ obtained by multiplying the Y-direction filter output I$_y$ by the first correction coefficient K$_1$ and the second X-direction filter output I$_{x2}$ are added up into a corrected first X-direction output I'$_{x1}$, and the second correction value K$_2$I$_y$ obtained by multiplying the Y-direction filter output I$_y$ by the second correction coefficient K$_2$ and the second X-direction filter output I$_{x2}$ are added up into a corrected second X-direction output I'$_{x2}$ (ST6).

Then, the process goes to Step 7 in which the voice coil motor 7 for each axis is driven in conformity with the results of computation (ST7).

Such moving member control makes it possible to achieve size reductions and high degrees of freedom in design, and displace or relocate the moving part 30 quickly and unerringly relative to the base part 30.

Reference is then made to the image-shake correction apparatus 1 according to the second embodiment of the invention.

Figure 14:
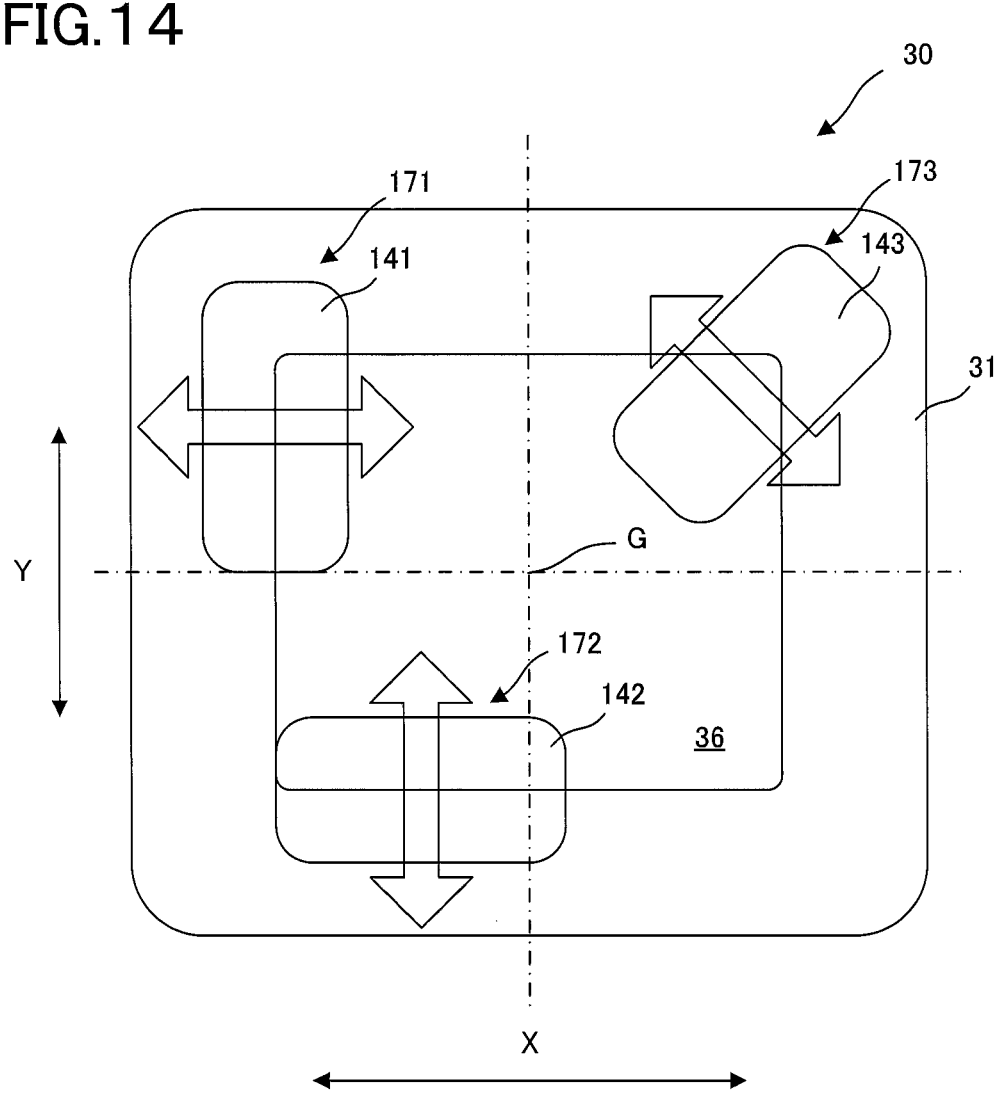
FIG. 14 is illustrative in schematic of the moving part in the image-shake correction apparatus according to the second embodiment of the invention.

FIG. 14 is illustrative in schematic of the moving part 30 in the image-shake correction apparatus 1 according to the second embodiment of the invention.

As shown in FIG. 14, the image-shake correction apparatus 1 according to the second embodiment of the invention comprises an X-direction voice coil motor 171 as a first driving part, a Y-direction voice coil motor 172 as a second driving part, and a rotational-direction voice coil motor 173 as a third driving part.

The X-direction voice coil motor 171 may be actuated to apply force to the moving part 30 for its movement in the X-direction, and the Y-direction voice coil motor 172 may be actuated to apply force to the moving part 30 for its movement in the Y-direction. The rotational-direction voice coil motor 173 may be actuated to apply force to the moving part 30 for its movement in the rotational direction. Note here that for the first, second and third driving parts, use may be made of not only the voice coil motors but also other actuators capable of producing driving forces.

For instance, while the X-direction voice coil motor 171 is driven in a constant position and the rotational-direction voice coil motor 173 is driven at a constant angle, a driving quantity instruction is given to the Y-direction voice coil motor 172 for its actuation thereby making sure translational driving of the moving part 30 in the Y-direction. While the Y-direction voice coil motor 172 is driven in a constant position and the rotational-direction voice coil motor 173 is driven at a constant angle, a driving quantity instruction is given to the X-direction voice coil motor 171 for its actuation thereby making sure translational driving of the moving part 30 in the X-direction. While the X-direction voice coil motor 171 is driven in a constant position and the Y-direction voice coil motor 172 is driven at a constant angle, a driving quantity instruction is given to the rotational-direction voice coil motor 173 for its actuation thereby making sure rotational driving of the moving part 30 about the center of gravity.

It is here to be noted that the voice coil motor 171, 172, and 173 is provided with an associated linear position sensor (not shown) to detect the position of the voice coil motor 171, 172, and 173, for instance, the position of the voice coil motor 171, 172, and 173 moving away from its normal state.

Figure 15:
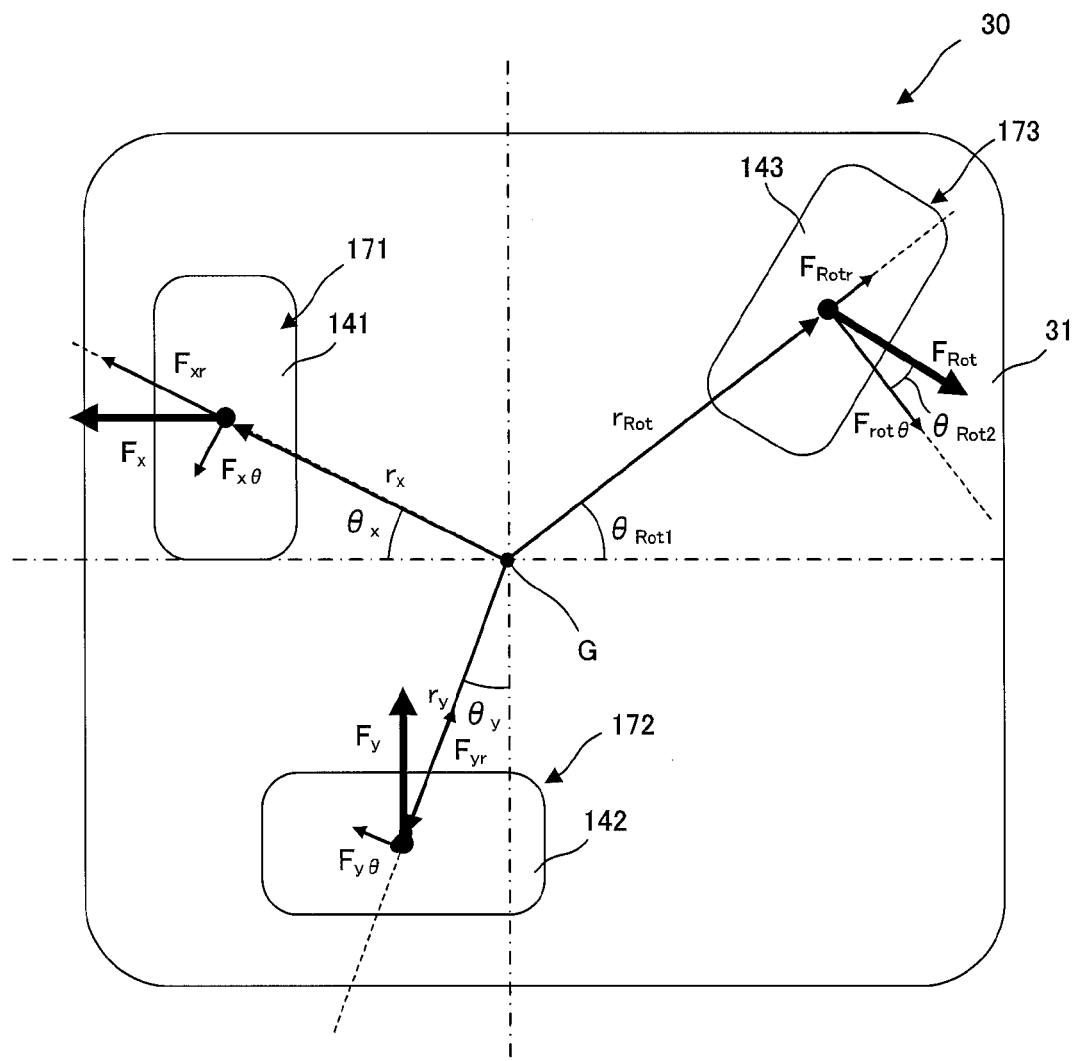
FIG. 15 is indicative of the directions of driving forces acting on the moving part according to the second embodiment of the invention.

FIG. 15 is indicative of the directions of forces acting on the moving part 30 in the second embodiment of the invention.

As shown in FIG. 15, the moving part 30 receives driving forces from the voice coil motors 171, 172 and 173. Referring to the second arrangement of the invention where the position of center of gravity G of the moving part 30 does not lie on the straight line of the vector of force given by the voice coil motors 171 and 172 to the moving part 30, the application of forces from the voice coil motors 171 and 172 to the moving part 30 may possibly give rise to unnecessary forces, resulting in a lowering of position control precision as is the case with the first embodiment of the invention. Where the vector of force given to the moving part 30 by the voice coil motor 173 that produces rotational force is not orthogonal to the straight line of connecting the center of gravity of the moving part 30 to the point of application of driving force of the voice coil motor 173, too, there may possibly be a lowering of position control precision because the voice coil motor 173 applies forces other than rotational force to the moving part 30.

The second embodiment of the invention is thus provided for holding back such unnecessary forces.

Figure 16:
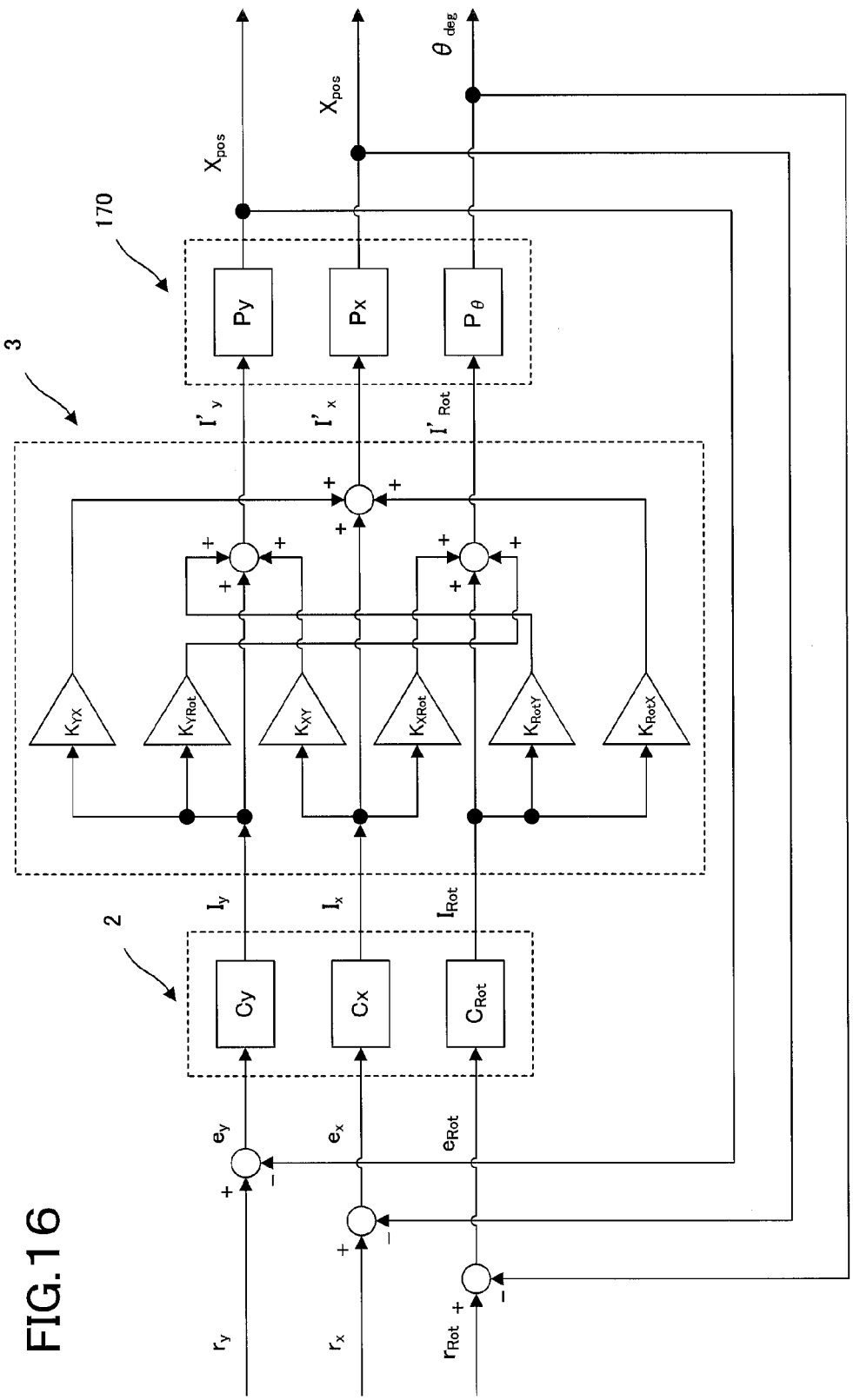
FIG. 16 is a control block diagram for the image-shake correction apparatus according to the second embodiment of the invention.

FIG. 16 is a control block diagram for the image-shake correction apparatus 1 according to the second embodiment of the invention.

The control block for the image-shake correction apparatus 1 includes a control part 2, a correction part 3 and a voice coil motor 170.

First, a first driving signal $r_x$ indicative of a relocation position is entered from a first instruction part (not shown) into a first X-direction voice coil motor 171, whereupon there is a first deviation or X-direction deviation $e_{x1}$ calculated in a first deviation calculation part, the X-direction deviation $e_{x1}$ being a difference between the first driving signal $r_x$ and the present position $X_{pos}$ of the X-direction voice coil motor 171: there is a feedback control achieved.

Likewise, a second driving signal $r_y$ indicative of a relocation position is entered from a second instruction part (not shown) into a Y-direction voice coil motor 172, whereupon there is a second deviation or Y-direction deviation $e_y$ calculated in a second deviation calculation part, the Y-direction deviation $e_y$ being a difference between the second driving signal $r_y$ and the present position $Y_{pos}$ of the Y-direction voice coil motor 172: there is a feedback control achieved.

Further, a third driving signal $r_{Rot}$ indicative of a relocation position is entered from a third instruction part (not shown) into a rotational-direction voice coil motor 173, whereupon there is a third deviation or rotational-direction deviation $e_{Rot}$ calculated in a third deviation calculation part, the rotational-direction deviation $e_{Rot}$ being a difference between the third driving signal $r_{Rot}$ and the present position $\theta_{pos}$ of the rotational-direction voice coil motor 173: there is a feedback control achieved.

A control part 2 receives the first X-direction deviation $e_x$, and implements phase compensation/gain multiplication processing via an IIR filter or the like inside it, producing an X-direction filter output $I_x$. The control part 2 also receives the Y-direction deviation $e_y$, and implements phase compensation/gain multiplication processing via an IIR filter or the like inside it, producing a Y-direction filter output $I_y$. Further, the control part 2 receives the rotational-direction deviation $e_{Rot}$, and implements phase compensation/gain multiplication processing via an IIR filter or the like inside it, producing a rotational-direction filter output $I_{Rot}$.

A correction part 3 receives the X-direction filter output $I_x$, and adds to it a first Y-direction correction value $K_{YX}I_y$ obtained by multiplying the Y-direction filter output $I_y$ by a first correction coefficient $K_{YX}$ and a first rotational-direction correction value $K_{RotX}I_{Rot}$ obtained by multiplying the rotational-direction filter output $I_{Rot}$ by a firth rotational-direction correction $K_{RotX}$, producing an X-direction output $I'_x$.

The correction part 3 also receives the Y-direction filter output $I_y$, and adds to it a first X-direction correction value $K_{XY}I_x$ obtained by multiplying the X-direction filter output $I_x$ by a first X-direction correction coefficient $K_{XY}$ and a second rotational-direction correction value $K_{RotY}I_{Rot}$ obtained by multiplying the rotational-direction filter output $I_{Rot}$ by a second rotational-direction correction coefficient $K_{RotY}$, producing a Y-direction output $I'_y$.

Further, the correction part 3 receives the rotational-direction filter output $I_{Rot}$, and adds to it a second X-direction correction value $K_{XRot}I_x$ obtained by multiplying the X-direction filter output $I_x$ by a second X-direction correction coefficient $K_{XxRot}$ and a second Y-direction correction value $K_{YRot}I_y$ obtained by multiplying the Y-direction filter output $I_y$ by a second Y-direction correction coefficient $K_{YRot}$, producing a rotational-direction output $I'_{Rot}$.

The voice coil motor 170 applies a current in conformity with the first X-direction output $I'_x$ from the correction part 3 to the first coil 141 to drive the first X-direction voice coil motor 171. The voice coil motor 170 also applies a current in conformity with the Y-direction output $I'_y$ from the correction part 3 to the second coil 142 to drive the Y-direction voice coil motor 172. Further, the voice coil motor 170 applies a current in conformity with the rotational-direction output $I'_{Rot}$ from the correction part 3 to the third coil 143 to drive the rotational-direction voice coil motor 173.

Reference is here made to how to calculate the first X-direction correction coefficient $K_{XY}$, second X-direction correction coefficient $K_{XRot}$, first Y-direction correction coefficient $K_{YX}$, second Y-direction correction coefficient $K_{YRot}$, first rotational-direction correction coefficient $K_{RotX}$ and second rotational-direction correction coefficient $K_{RotY}$ used for multiplication in the correction part 3.

As shown in FIG. 15, the force needed for the Y-direction voice coil motor 172 is only the force for driving and translating the moving part 30 in the Y-direction. In other words, other unnecessary forces resulting from the driving force $F_y$ of the Y-direction voice coil motor 172 must be canceled out by the driving force $F_x$ of the X-direction voice coil motor 171 and the driving force $F_{Rot}$ of the rotational-direction voice coil motor 173.

For the purpose of canceling out other unnecessary forces resulting from the driving force $F_y$ of the Y-direction voice coil motor 172 by the driving force $F_x$ of the X-direction voice coil motor 171 and the driving force $F_{Rot}$ of the rotational-direction voice coil motor 173, it is required to satisfy the following condition (3) for canceling out rotational force and the following condition (4) for canceling out X-translational force.

$$F_{y\theta} \cdot r_y + F_{x\theta} \cdot r_x + F_{Rot\theta} \cdot r_{Rot} = 0 \quad (3)$$

$$F_{yr} \cdot \sin\theta_y + F_{xr} \cdot \cos\theta_x + F_{Rotr} \cdot \cos\theta_{Rot1} = 0 \quad (4)$$

where $|F_{y\theta}| = |F_y| \cdot \sin\theta_y$
$|F_{x\theta}| = |F_x| \cdot \sin\theta_x$
$|F_{Rot\theta}| = |F_{Rot}| \cdot \cos\theta_{Rot2}$
$|F_{yr}| = |F_y| \cdot \cos\theta_y$
$|F_{xr}| = |F_x| \cdot \cos\theta_x$
$|F_{Rotr}| = |F_{Rot}| \cdot \sin\theta_{Rot2}$ Note here that each variable contains a sign in conformity to the direction of a vector.

By solving the simultaneous equations: conditions (3) and (4) with respect to the driving force $F_x$ of the X-direction voice coil motor 171 and the driving force $F_{Rot}$ of the rotational-direction voice coil motor 173, it is possible to take the driving force $F_x$ of the X-direction voice coil motor 171 and the driving force $F_{Rot}$ of the rotational-direction voice coil motor 173 as the first X-direction correction coefficient $K_{YX}$ and the first rotational-direction correction coefficient $K_{YRot}$ with the proviso that the driving force $F_y$ of the Y-direction voice coil motor 172 is 1.

Likewise, under the condition that Y-direction translational and rotational force components, other than the X-direction translational force component, of the driving force $F_x$ of the X-direction voice coil motor 171 can be canceled out by the driving force $F_y$ of the Y-direction voice coil motor 172 and the driving force $F_{Rot}$ of the rotational-direction voice coil motor 173, it is possible to find the first Y-direction correction coefficient $K_{XY}$ and the second rotational-direction correction coefficient $K_{XRot}$.

Further, under the condition that X- and Y-direction translational force components, other than the rotational force component, of the driving force $F_{Rot}$ of the rotational-direction voice coil motor 173 can be canceled out by the driving force $F_x$ of the Y-direction voice coil motor 171 and the driving force $F_y$ of the Y-direction voice coil motor 172, it is possible to find the second X-direction correction coefficient $K_{RotY}$ and second Y-direction correction coefficient $K_{RotX}$.

And, as shown in FIG. 16, the output value from the control part 2 is corrected by multiplying it by the first X-direction correction coefficient $K_{XY}$, second X-direction correction coefficient $K_{XRot}$, first Y-direction correction coefficient $K_{YX}$, second Y-direction correction coefficient $K_{YRot}$, first rotational-direction correction coefficient $K_{RotX}$ and second rotational-direction correction coefficient $K_{RotY}$ with respect to other axes, so that it is possible to implement processing in a constantly unerring position relative to varying driving forces.

Figure 17:
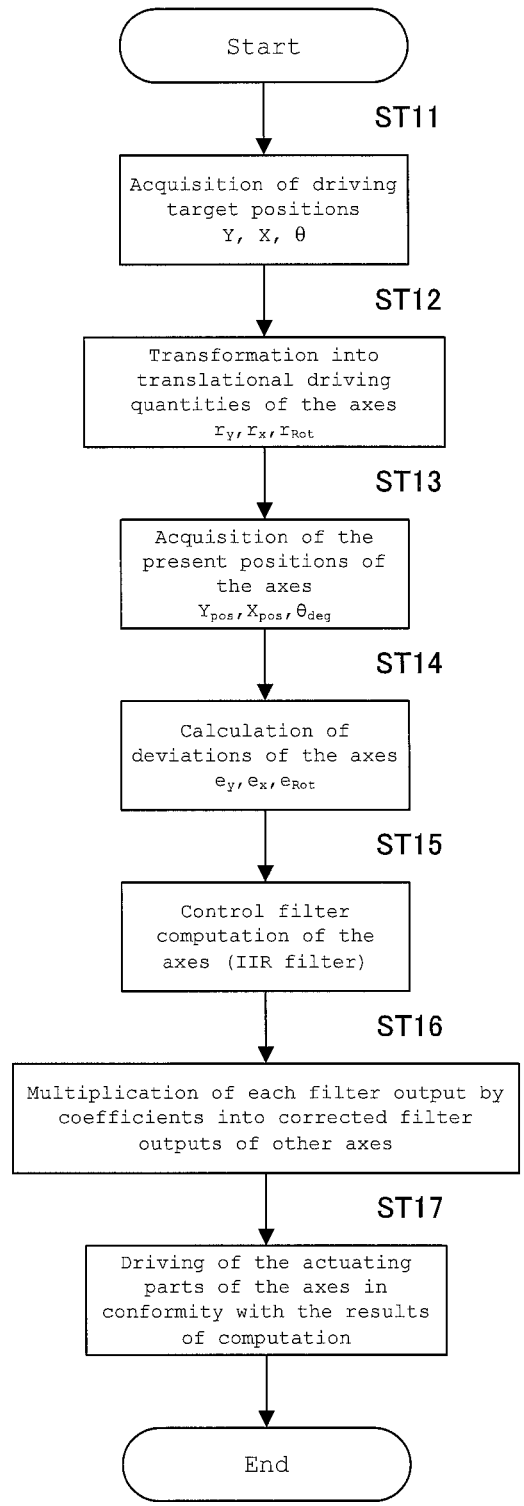
FIG. 17 is a flowchart for the image-shake correction apparatus according to the second embodiment of the invention.

FIG. 17 is a flowchart for the image-shake correction apparatus 1 according to the second embodiment of the invention.

In the control process of the moving member in the image-shake correction apparatus 1 according to the second embodiment of the invention, driving target positions X, Y and θ are first acquired in Step 11 (ST11).

Then, the process goes to Step 12 in which the driving target positions X, Y and θ are transformed into translational driving quantities $r_{x1}$, $r_{x2}$ and $r_y$ in the X-, X- and rotational-direction axes (ST12).

Then, the process goes to Step 13 in which the present positions $X_{pos}$, $Y_{pos}$ and $\theta_{deg}$ of the axes are acquired via the Hall elements 34 (ST13).

Then, the process goes to Step 14 in which the differences between the present positions $X_{pos}$, $X_{pos}$ and $\theta_{deg}$ acquired in Step 13 are found from the translational driving quantities $r_x$, $r_y$ and $r_{Rot}$ in the axes, obtained in Step 12, to figure out the deviations $e_x$, $e_y$ and $e_{Rot}$ of the axes (ST14).

Then, the process goes to Step 15 in which the control filter outputs $I_x$, $I_y$ and $I_{Rot}$ of the axes are computed in the control part 2 (ST15).

Then, the process goes to Step 16 in which, in the correction part 3, the filter output value is corrected by multiplying it by the first X-direction correction coefficient $K_{XY}$, second X-direction correction coefficient $K_{XRot}$, first Y-direction correction coefficient $K_{YX}$, second Y-direction correction coefficient $K_{YRot}$, first rotational-direction correction coefficient $K_{RotX}$ and second rotational-direction correction coefficient $K_{RotY}$ with respect to other axes (ST16).

Then, the process goes to Step 17 in which the voice coil motor 170 for each axis is driven in conformity with the results of computation (ST17).

Such moving member control makes it possible to achieve size reductions and high degrees of freedom in design, and displace or relocate the moving part 30 quickly and unerringly relative to the base part 30.

The image-shake correction apparatus as described above may be used with electronic imaging apparatus, inter alia, a digital camera, a video camera or the like, as can be seen from the following exemplary embodiments.

Figure 18:
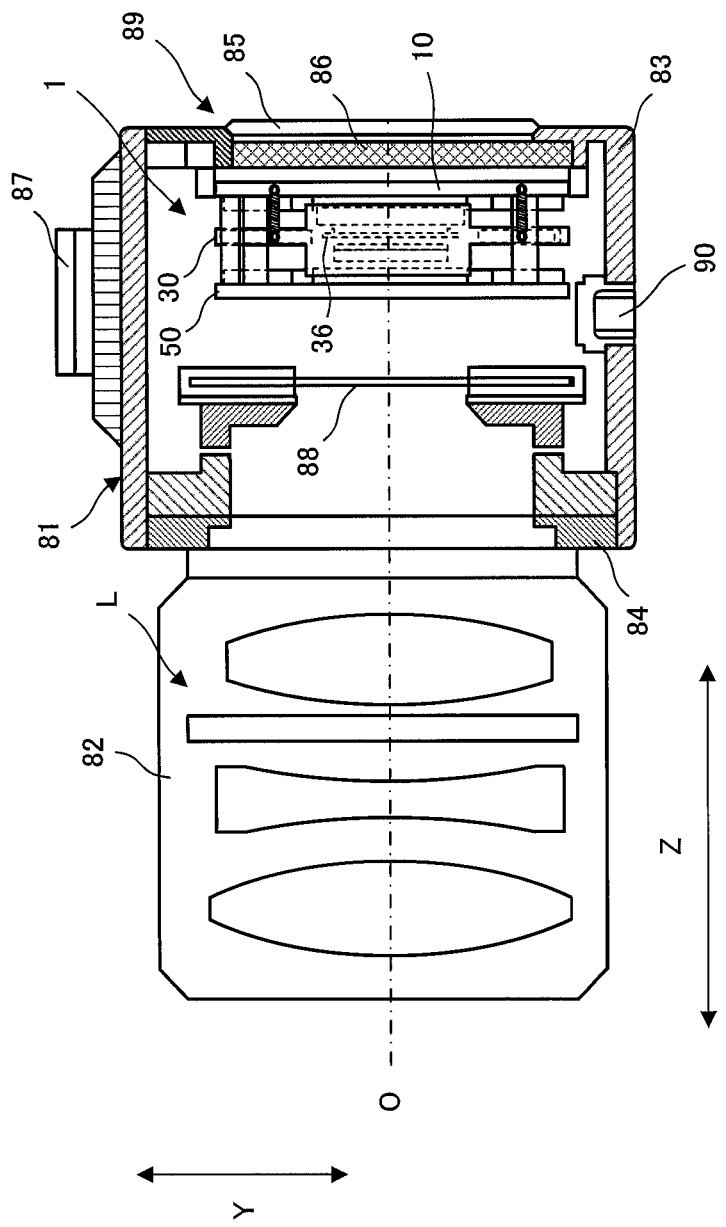
FIG. 18 is illustrative of an imaging apparatus including the image-shake correction apparatus according to one embodiment of the invention.
Figure 19:
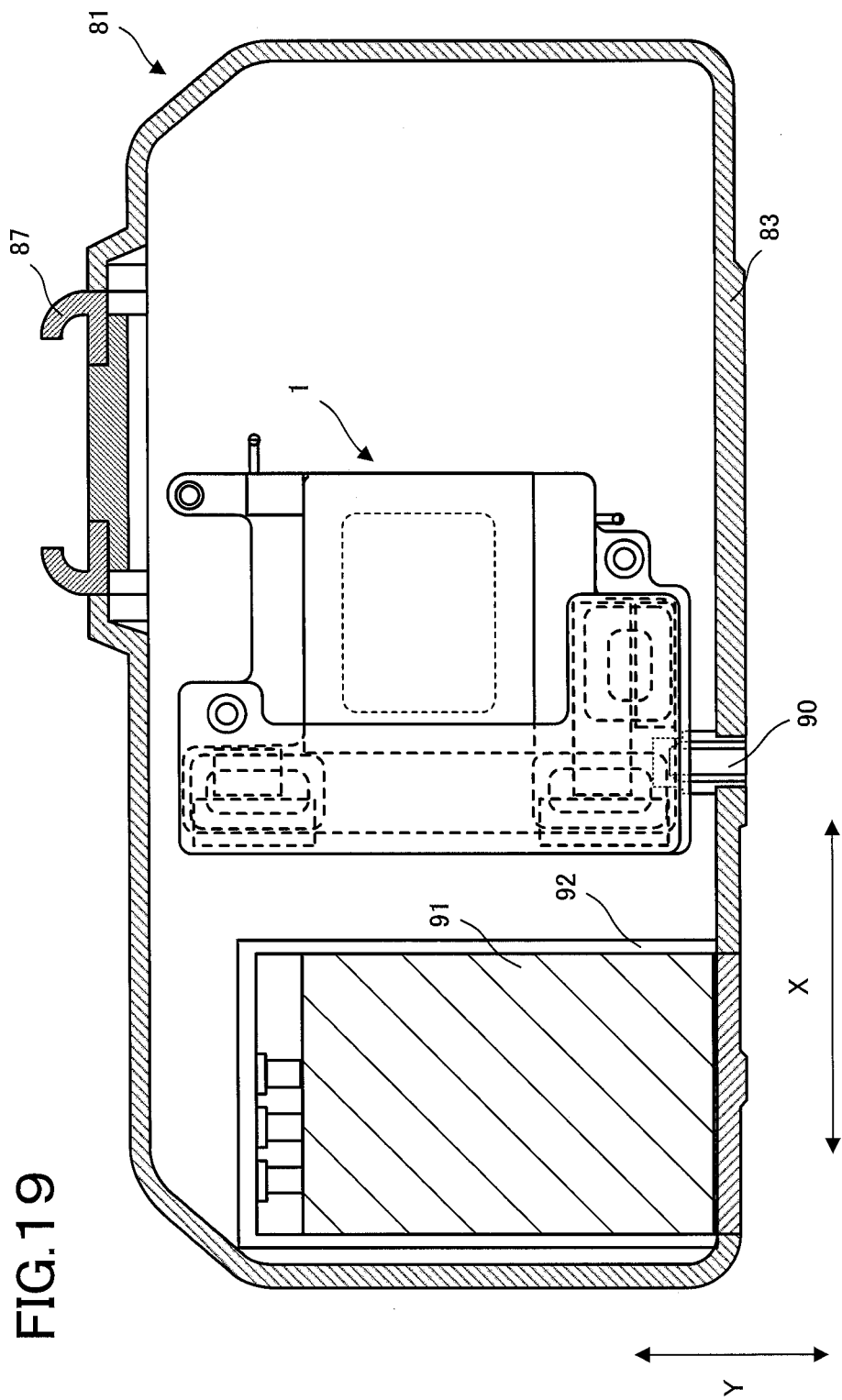
FIG. 19 is illustrative of the image-shake correction apparatus, etc. in the imaging apparatus.

FIG. 18 is illustrative of an imaging apparatus comprising the image-shake correction apparatus according to one embodiment of the invention, and FIG. 19 is illustrative of the image-shake correction apparatus, etc. within the imaging apparatus.

A digital camera 80 that is an imaging apparatus comprising the image-shake correction apparatus according to one embodiment of the invention comprises a camera body 81, and a lens unit 82 including an imaging lens L that is interchangeably mounted on the camera body 81, as shown in FIGS. 18 and 19.

It is here to be noted that an axis of light entering from the imaging lens L into the camera body 81 is indicated by "O", and that the object side of the cameral body 81 with respect to the axis of incident light is called the front (front surface side) and the imaging side is called the rear (rear surface side). It is also to be noted that of directions orthogonal to the optical axis O, the horizontal direction as viewed from the front in an ordinary operation state is defined as the first or X direction, and the vertical direction is defined as the second or Y direction. The first or X direction and the second or Y direction correspond to the first or X direction and the second or Y direction with respect to the image-shake correction apparatus 1.

The camera body 81 comprises an outer casing 83 also serving as a camera proper that houses therein members forming the digital camera 80, and includes in a front position on the incident optical axis O a ring-like mount 84 for interchangeable mounting of the lens unit 82. On the left side as viewed from the front, the outer casing 83 is provided with a grip (not shown) held by the right hand of a camera operator during imaging operation. Located on top of the grip are various switches and buttons (not shown) such as a release button.

Further, the camera body 81 comprises a battery chamber 92 for stowing away batteries 91 within the outer casing 83. In the rear of the battery chamber 92, there are a circuit board or the like (not shown) provided, including a control circuit for implementing control over the camera, image processing, compression processing, data storage processing or the like, and a memory such as SDRAM and a power source circuit, etc. Furthermore, the camera body 81 has a built-in shake-status detector (not shown) for that camera body which uses a gyro sensor (not shown) or the like as an example.

As shown in FIGS. 18 and 19, the camera body 81 further comprises a liquid crystal panel 86 having a panel display window on the rear surface side of the outer casing 83. This liquid crystal panel 86 is a TFT (thin-film transistor) type of rectangular display panel that is capable of not only displaying taken images but also showing as images various information pieces such as various settings and adjustments. On top of the outer casing 83, there is a hot shoe 87 located for attachment of an optical viewfinder, an electronic viewfinder, an external flash, a microphone, etc.

Within the outer casing 83 of the camera body 81, there are a focal plane shutter 88 and an imaging unit 89 received as shown in FIG. 18. The imaging unit 89 comprises an image-shake preventing apparatus 1 that supports an imaging device 36 such as a CCD and CMOS sensor on the XY plane in a displaceable fashion and uses a voice coil motor as an actuator. This image-shake preventing apparatus 1 operates in response to a shake signal from the above-mentioned shake detector to cancel out forces detected in the shake direction. The imaging device 36 includes a rectangular light-receiving plane having a long side along the X direction. The outer casing 83 is provided on its bottom surface with a tripod screw portion 90.

Figure 20:
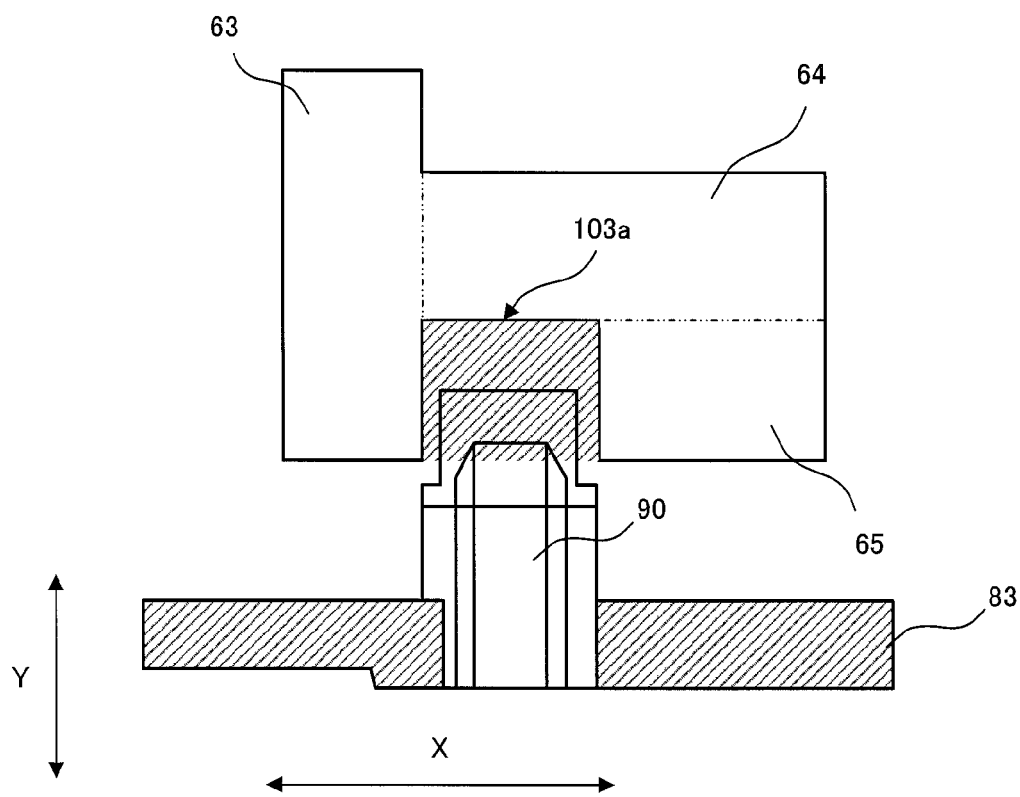
FIG. 20 is an enlarged view of the imaging apparatus in the vicinity of a tripod screw portion.

FIG. 20 is an enlarged view of the digital camera 80 in the vicinity of the tripod screw portion.

Upon mounting of the image-shake correction apparatus 1 to the digital camera 80, there is a possibility that it may interfere with the tripod screw portion 90. Such interference can be avoided if the X-direction lengths of the fourth and fifth magnet portions 64 and 65 differ from each other to receive the tripod screw portion 90 in the fifth space 103a as shown in FIG. 20.

Thus, upon attachment of the image-shake correction apparatus 1 to the digital camera 80, there is a possibility that the members within the digital camera 80 may interfere with the image-shake correction apparatus 1. This interference of the members within the digital camera 80 with the image-shake correction apparatus 1 can be avoided if the lengths of the magnet portions differ from each other to form the cutouts for receiving those members, thereby reducing the size of the digital camera 80.

Figure 21:
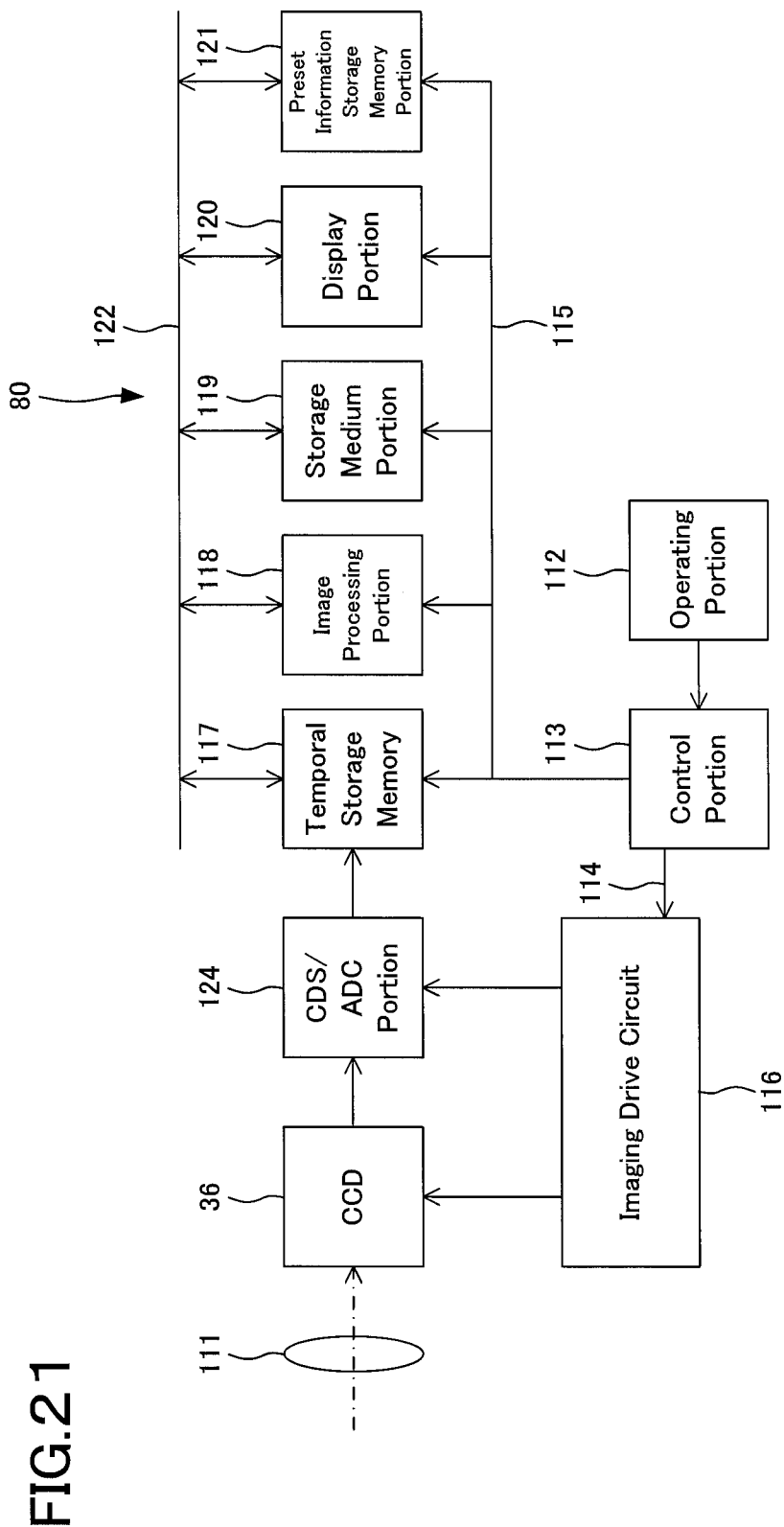
FIG. 21 is a block diagram showing the control arrangement of the digital camera according to one embodiment of the invention.

FIG. 21 is a block diagram illustrative of the internal circuitry of a main part of the digital camera 80 according to the embodiment of the invention here. In the following explanation, the processing means are constructed typically from a CDS/ADC portion 124, a temporal storage memory 117, an image processing portion 118 and so on, and the storage means is made up of storage medium, and so on.

As shown in FIG. 21, the digital camera 80 includes an operating portion 112, a control portion 113 connected to the operating portion 112, an imaging drive circuit 116 and a temporal storage memory 117 connected to the control signal output port of the control portion 113 via buses 114 and 115, an image processing portion 118, a storage medium portion 119, a display portion 120, and a preset information storage memory portion 121.

The temporal storage memory 117, image processing portion 118, storage medium portion 119, display portion 120 and preset information storage memory portion 121 are designed such that data are mutually entered in or produced out of them via a bus 122, and the imaging drive circuit 116 is connected with the imaging device 36 and CDS/ADC portion 124.

The operating portion 112 is a circuit including various input buttons and switches, through which event information entered (by the camera operator) from outside is notified to the control portion 113. The control portion 113 is a central computing unit that is made up of typically a CPU and has a built-in program memory (not shown): it is a circuit that, according to the program loaded in that program memory, has control over the digital camera 80.

The imaging device 36 such as the CCD is the one that is driven and controlled by the imaging drive circuit 116, and converts or transforms light quantity per pixel of the object image formed through the imaging optical system 141 into electrical signals that are in turn sent out to the CDS/ADC portion 124.

The CDS/ADC portion 124 is a circuit that amplifies electrical signals entered from the imaging device 36, processes means of a co-related double sampling to remove noises occurring analog to digital conversion and implements analog-to-digital conversion. Then, image raw data (Bayer data: hereinafter called the RAW data) subjected only to amplification and digital conversion are sent out to the temporal storage memory 117.

The temporal storage memory 117 is a buffer made up of typically an SDRAM: it is a memory device for temporal storage of the RAW data produced out of the CDS/ADC portion 124. The image processing portion 118 is a circuit that reads out the RAW data stored in the temporal storage memory 117 or the RAW data stored in the storage medium portion 119 thereby electrically implementing various forms of processing including distortion correction, based on an image quality parameter instructed by the control portion 113.

The storage medium portion 119 detachably receives a card type or stick type of recording medium comprising typically a flash memory so that the RAW data transferred from the temporal memory 117 or image data processed at the image processing portion 118 are recorded and held in that flash memory.

The display portion 120 is made up of a liquid crystal display monitor or the like to display the taken RAW data or image data, operating menus or the like on it. The preset information storage memory portion 121 includes a ROM portion having various image quality parameters previously loaded in it, and a RAM portion for storing an image quality parameter read out of that ROM portion by entering operation of the operating portion 112.

The thus assembled digital camera 80 makes use of the inventive lens system as the imaging optical system 111, providing an imaging apparatus that is of small-format size and well fit for taking of moving images.

It is to be understood that some embodiments described herein are not intended as limitations on the present invention. Although many exemplary specific details are included in the explanation of illustrative embodiments, it will be readily apparent to those skilled in the art that varying substitutions or modifications may be made to such detailed disclosures without departing from the scope of the invention. In other words, some exemplary embodiments of the invention have been described without losing the generality of the invention recited in the claims, and imposing any particular limitations on the invention.

For instance, some embodiments of the invention have been explained with reference to a specific arrangement wherein the movement of the moving part 30 having the imaging device 36 is controlled; however, the movement of the lens unit 82 may be controlled. The invention may also be applied to a translating member such as a printer head.

EXPLANATIONS OF THE NUMERAL REFERENCES

1: Image-shake correction apparatus (Moving member control apparatus)
10: Base part (foundation part)

11: Base body
12a, 12b: Supporting through-holes
13a, 13b: First spring support part
15a, 15b: Coil spring
20: First permanent magnet group (permanent magnet)
21: First magnet part (first permanent magnet)
22: Second magnet part (first permanent magnet)
23: Third magnet part (first permanent magnet)
24: Fourth magnet part (second permanent magnet, third permanent magnet)
25: Fifth magnet part (third permanent magnet)
30: Moving part
31: Moving body
32: Coil housing
33a, 33b: Second spring support part
34: Hall elements (position acquisition part)
35: Temperature sensor
36: Imaging device
37: Filter group
37a: Ultrasonic filter
37b: Infrared cut filter
38: Electric device
40: Coil group
41: First coil
42: Second coil
43: Third coil
50: Magnet support part
51: Support body
52a, 52b: Threaded through-holes
60: Second permanent magnet group (permanent magnet)
61: First opposite magnet part
62: Second opposite magnet part
63: Third opposite magnet part
64: Fourth opposite magnet part
65: Fifth opposite magnet part
70: Voice coil motor
71: First X-direction voice coil motor (first driving part, first voice coil motor)
72: Second X-direction voice coil motor (second driving part, second voice coil motor)
73: Y-direction voice coil motor (third driving part, third voice coil motor)
80: Digital camera (imaging apparatus)
81: Camera body
82: Lens unit
83: Outer casing
84: Mount
85: Panel display window
86: Liquid crystal panel
87: Hot shoe
88: Focal plane shutter
89: Imaging unit
90: Tripod screw portion
91: Battery
92: Battery chamber
101a: First space (cutout)
101b: Second space (cutout)
102a: Third space (cutout)
102b: Fourth space (cutout)
103a: Fifth space (cutout)
103b: Sixth space (cutout)
111: Imaging optical system
112: Operating part
113: Control part
114, 115: Bus
116: Imaging drive circuit
117: Temporary storage memory
118: Image processing portion
119: Storage medium portion
120: Display part
121: Preset information storage memory portion
122: Bus
124: CDS/ADC portion
141: First coil
142: Second coil
143: Third coil
170: Voice coil motor
171: X-direction voice coil motor (first driving part, first voice coil motor)
172: Y-direction voice coil motor (second driving part, second voice coil motor)
173: Rotational-direction voice coil motor (third driving part, third voice coil motor)

What is claimed is:

1. A moving member control apparatus comprising:
a foundation part,
a moving part that is movable relatively with respect to the foundation part in a horizontal, vertical, and rotational direction,
a first driving part that applies a first driving force to the moving part toward a direction different from a direction relative to a position of center of gravity of the moving part,
a second driving part that applies a second driving force to the moving part toward a direction different from a direction relative to the position of center of gravity of the moving part,
a third driving part that applies a third driving force to the moving part in a direction different from those relative to the first driving part and the second driving part,
a control part that controls the driving forces of the first driving part, the second driving part and the third driving part, and
a correction part that makes correction of a first output value produced from the control part to the first driving part and a second output value produced from the control part to the second driving part depending on a third output value produced from the control part to the third driving part, wherein:
the correction part makes correction of a first output value produced from the control part to the first driving part and a second output value produced from the control part to the second driving part, depending on a third output value produced from the control part to the third driving part, in such a way as to satisfy two conditions: a first condition under which a total sum of a first rotational force occurring from the first driving force with the position of center of gravity of the moving part as a center of rotation, a second rotational force occurring from the second driving force with the position of center of gravity of the moving part as a center of rotation and a third rotational force occurring from the third driving force with the position of center of gravity of the moving part as a center of rotation becomes zero, and a second condition under which a first translational force occurring from the first driving force in the horizontal direction relative to a directional component going toward the position of center of gravity of the moving part, a second translational force occurring from the second driving force in the horizontal direction relative to a directional component going toward the position of center of gravity of the moving part and a third translational force occurring from the third driving force, the third translational force being a component in the horizontal direction which component is relative to a component in a direction toward the position of center of gravity of the moving part, becomes zero.

2. A moving member control apparatus comprising:
a foundation part,
a moving part that is movable relatively with respect to the foundation part in a horizontal, vertical, and rotational direction,
a first driving part that applies a first driving force to the moving part toward a direction different from a direction relative to a position of center of gravity of the moving part,
a second driving part that applies a second driving force to the moving part toward a direction different from a direction relative to the position of center of gravity of the moving part,
a third driving part that applies a third driving force to the moving part in a direction different from those relative to the first driving part and the second driving part,
a control part that controls the driving forces of the first driving part, the second driving part and the third driving part, and
a correction part that makes correction of a first output value produced from the control part to the first driving part and a third output value produced from the control part to the second driving part depending on a second output value produced from the control part to the second driving part, wherein:
the correction part makes correction of a first output value produced from the control part to the first driving part and a third output value produced from the control part to the third driving part, depending on a second output value produced from the control part to the second driving part, in such a way as to satisfy two conditions: a first condition under which a total sum of a first rotational force occurring from the first driving force with the position of center of gravity of the moving part as a center of rotation, a second rotational force occurring from the second driving force with the position of center of gravity of the moving part as a center of rotation and a third rotational force occurring from the third driving force with the position of center of gravity of the moving part as a center of rotation becomes zero, and a second condition under which a first translational force occurring from the first driving force in the horizontal direction relative to a directional component going toward the position of center of gravity of the moving part, a second translational force occurring from the second driving force in the horizontal direction relative to a directional component going toward the position of center of gravity of the moving part and a third translational force occurring from the third driving force, the third translational force being a component in the horizontal direction which component is relative to a component in a direction toward the position of center of gravity of the moving part, becomes zero.

3. The moving member control apparatus according to claim 1, wherein the first driving part and the second driving part apply driving forces in different directions.

4. The moving member control apparatus according to claim 2, wherein the first driving part and the second driving part apply driving forces in different directions.

5. The moving member control apparatus according to claim 2, wherein the correction part make correction of the second output value produced from the control part to the second driving part and the third output value produced from the control part to the third driving part, depending on the first output value produced from the control part to the first driving part, in such a way as satisfy three conditions: the first condition and the second condition plus a third condition under which a total sum of three translational forces becomes zero: a fourth translational force occurring from the first driving force in the vertical direction relative to a directional component going toward the position of center of gravity of the moving part, a fifth translational force occurring from the second driving force in the vertical direction relative to a directional component going toward the position of center of gravity of the moving part and a sixth translational force occurring from the third driving force in the vertical direction relative to a directional component going toward the position of center of gravity of the moving part.

6. The moving member control apparatus according to claim 1 further comprising:
a first instruction part that gives an instruction to the first driving part about a relocation position,
a second instruction part that gives an instruction to the second driving part about a relocation position,
a third instruction part that gives instruction to the third driving part about a relocation position,
a first position acquisition part that acquires an actual position of the first driving part,
a second position acquisition part that acquires an actual position of the second driving part,
a third position acquisition part that acquires an actual position of the third driving part,
a first deviation calculation part that calculates a first deviation between the relocation position instructed by the first instruction part and the actual position acquired by the first position acquisition part,
a second deviation calculation part that calculates a second deviation between the relocation position instructed by the second instruction part and the actual position acquired by the second position acquisition part, and
a third deviation calculation part for calculating a third deviation between the relocation position instructed by the third instruction part and the actual position acquired by the third position acquisition part, wherein:
the first deviation, the second deviation and the third deviation are entered from the first deviation calculation part, the second deviation calculation part and the third deviation calculation part into the control part.

7. The moving member control apparatus according to claim 2 further comprising:
a first instruction part that gives an instruction to the first driving part about a relocation position,
a second instruction part that gives an instruction to the second driving part about a relocation position,
a third instruction part that gives instruction to the third driving part about a relocation position,
a first position acquisition part for acquiring an actual position of the first driving part,
a second position acquisition part that acquires an actual position of the second driving part,
a third position acquisition part that acquires an actual position of the third driving part,
a first deviation calculation part that calculates a first deviation between the relocation position instructed by the first instruction part and the actual position acquired by the first position acquisition part,
a second deviation calculation part that calculates a second deviation between the relocation position instructed by the second instruction part and the actual position acquired by the second position acquisition part, and a third deviation calculation part that calculates a third deviation between the relocation position instructed by the third instruction part and the actual position acquired by the third position acquisition part, wherein:

the first deviation, the second deviation and the third deviation are entered from the first deviation calculation part, the second deviation calculation part and the third deviation calculation part into the control part.

8. The moving member control apparatus according to claim 1 wherein:

the foundation part includes a first permanent magnet, a second permanent magnet and a third permanent magnet, the moving part includes a first coil located in a position opposing to the first permanent magnet, a second coil located in a position opposing to the second permanent magnet and a third coil located in a position opposing to the third permanent magnet, the first permanent magnet and the first coil form a first voice coil motor as the first driving part, the second permanent magnet and the second coil form a second voice coil motor as the second driving part, and the third permanent magnet and the third coil form a third voice coil motor as the third driving part.

9. The moving member control apparatus according to claim 2 wherein:

the foundation part includes a first permanent magnet, a second permanent magnet and a third permanent magnet, the moving part includes a first coil located in a position opposing to the first permanent magnet, a second coil located in a position opposing to the second permanent magnet and a third coil located in a position opposing to the third permanent magnet, the first permanent magnet and the first coil form a first voice coil motor as the first driving part, the second permanent magnet and the second coil form a second voice coil motor as the second driving part, and the third permanent magnet and the third coil form a third voice coil motor as the third driving part.

10. An imaging apparatus comprising:

the moving member control apparatus according to claim 1, an imaging device located on the moving part for photoelectric conversion of light, and a body having the moving member control apparatus.

11. An imaging apparatus comprising:

the moving member control apparatus according to claim 2, an imaging device located on the moving part for photoelectric conversion of light, and a body having the moving member control apparatus.

* * * * *